United States Patent
Le et al.

(10) Patent No.: US 10,320,202 B2
(45) Date of Patent: Jun. 11, 2019

(54) BATTERY SYSTEM BI-STABLE RELAY CONTROL

(71) Applicant: Johnson Controls Technology Company, Holland, MI (US)

(72) Inventors: Daniel B. Le, Grafton, WI (US); Perry M. Wyatt, Fox Point, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 219 days.

(21) Appl. No.: 14/502,158

(22) Filed: Sep. 30, 2014

(65) Prior Publication Data

US 2016/0089992 A1 Mar. 31, 2016

(51) Int. Cl.
*H02J 7/00* (2006.01)
*H02J 7/14* (2006.01)
*B60L 11/18* (2006.01)

(52) U.S. Cl.
CPC ......... *H02J 7/0003* (2013.01); *B60L 11/1868* (2013.01); *H02J 7/1423* (2013.01); *H02J 7/1446* (2013.01); *B60L 2240/547* (2013.01); *Y02T 10/7011* (2013.01); *Y02T 10/7016* (2013.01); *Y02T 10/7066* (2013.01); *Y02T 10/92* (2013.01)

(58) Field of Classification Search
CPC ............................ B60L 11/1809; H02J 7/0003
USPC .... 290/36 R, 37 R, 38 R; 320/107, 109, 126
See application file for complete search history.

(56) References Cited

U.S. PATENT DOCUMENTS

| 313,117 A | * | 3/1885 | Stanley, Jr. | ............... | H02J 1/10 |
| | | | | | 307/18 |
| 3,560,818 A | * | 2/1971 | Amato | ................. | H02K 19/103 |
| | | | | | 310/163 |

(Continued)

FOREIGN PATENT DOCUMENTS

| CN | 1440583 | 9/2003 |
| CN | 102555765 | 7/2012 |
| DE | 102011000490 | 3/2012 |

OTHER PUBLICATIONS

"Turning off the car's engine saves fuel when the stops are long, but it's not a good idea for short stops," Michel Austin, Car and driver, Published Online Dec. 2008, https://web.archive.org/web/20130612034022/http://www.caranddriver.com/features/gas-pains-mileage-myths-and-misconceptions-turning-off-the-cars-engine-saves-fuel-when-the-stops-a.*

(Continued)

*Primary Examiner* — Robert J Grant
*Assistant Examiner* — John T Trischler
(74) *Attorney, Agent, or Firm* — Fletcher Yoder, P.C.

(57) ABSTRACT

A 12 volt automotive battery system includes a first battery coupled to an electrical system, and the first battery includes a first battery chemistry. Further, the 12 volt automotive battery system includes a second battery coupled in parallel with the first battery and selectively coupled to the electrical system via a bi-stable relay. The second battery includes a second battery chemistry that has a higher coulombic efficiency than the first battery chemistry. Additionally, the bi-stable relay couples the second battery to the electrical system during regenerative braking to enable the second battery to capture a majority of the power generated during regenerative braking. Furthermore, the bi-stable relay maintains a coupling of the second battery to the electrical system (Continued)

when the vehicle transitions from a key-on position to a key-off position.

20 Claims, 8 Drawing Sheets

(56) References Cited

U.S. PATENT DOCUMENTS

| | | | | |
|---|---|---|---|---|
| 3,917,017 | A * | 11/1975 | Deane | B60L 11/126 180/65.245 |
| 3,947,744 | A * | 3/1976 | Grace | F15B 21/14 290/50 |
| 3,959,701 | A * | 5/1976 | Bader | B60L 15/04 318/139 |
| 4,004,208 | A * | 1/1977 | Tamminen | B60R 16/0235 307/150 |
| 4,025,860 | A * | 5/1977 | Shibata | B60L 11/1853 180/65.1 |
| 4,218,717 | A * | 8/1980 | Shuster | B60Q 9/001 307/10.7 |
| 4,345,197 | A * | 8/1982 | Wheadon | H02J 7/1423 320/124 |
| 4,348,628 | A * | 9/1982 | Loucks | H02J 7/1423 180/65.1 |
| 5,204,610 | A * | 4/1993 | Pierson | H02J 9/061 307/66 |
| 5,285,862 | A * | 2/1994 | Furutani | B60K 6/28 180/65.245 |
| 5,355,071 | A * | 10/1994 | Ishida | H02J 7/1423 320/110 |
| 5,373,195 | A * | 12/1994 | De Doncker | B60L 11/005 307/45 |
| 5,488,283 | A * | 1/1996 | Dougherty | B60L 11/1855 307/10.1 |
| 5,542,488 | A | 8/1996 | Nixon | |
| 5,670,861 | A * | 9/1997 | Nor | B60L 11/185 307/10.7 |
| 5,773,962 | A * | 6/1998 | Nor | B60L 11/185 320/116 |
| 5,780,980 | A * | 7/1998 | Naito | B60K 6/28 307/19 |
| 5,844,325 | A * | 12/1998 | Waugh | H01M 10/122 307/10.7 |
| 5,893,124 | A * | 4/1999 | Ogaki | G06F 17/21 358/401 |
| 5,977,744 | A * | 11/1999 | Williams | H02J 7/1423 320/104 |
| 6,229,279 | B1 * | 5/2001 | Dierker | H02J 7/0013 307/10.1 |
| 6,320,351 | B1 * | 11/2001 | Ng | H02J 7/0032 320/104 |
| 6,452,361 | B2 * | 9/2002 | Dougherty | G08B 29/181 320/104 |
| 6,491,121 | B2 | 12/2002 | Morimoto et al. | |
| 6,924,621 | B2 | 8/2005 | Jabaji et al. | |
| 6,949,897 | B2 * | 9/2005 | Wakashiro | B60K 6/485 180/65.1 |
| 7,116,078 | B2 * | 10/2006 | Colombo | H02J 7/0032 320/104 |
| 7,119,516 | B2 * | 10/2006 | Denning | B25F 5/00 320/106 |
| 7,164,214 | B2 * | 1/2007 | Eisenberger | H02J 9/061 307/18 |
| 7,176,654 | B2 | 2/2007 | Meyer et al. | |
| 7,196,492 | B2 * | 3/2007 | Sugiura | B60L 11/1887 320/101 |
| 7,301,245 | B2 * | 11/2007 | Sugiura | B60K 6/48 180/65.29 |
| 7,388,349 | B2 * | 6/2008 | Elder | B60L 3/0046 307/10.6 |
| 7,419,020 | B2 * | 9/2008 | Pott | B60K 6/28 180/65.1 |
| 7,486,034 | B2 * | 2/2009 | Nakamura | B60L 7/06 307/10.1 |
| 7,489,048 | B2 | 2/2009 | King et al. | |
| 7,567,057 | B2 * | 7/2009 | Elder | B60L 3/0046 307/10.6 |
| 7,570,012 | B2 | 8/2009 | Dasgupta et al. | |
| 7,667,416 | B2 | 2/2010 | Queveau et al. | |
| 7,679,325 | B2 | 3/2010 | Seo | |
| 7,872,443 | B2 * | 1/2011 | Ward | H02J 7/35 320/103 |
| 7,884,569 | B2 * | 2/2011 | Ward | B60L 8/003 180/2.1 |
| 7,969,040 | B2 * | 6/2011 | Conen | H02J 1/10 307/9.1 |
| 8,004,249 | B2 | 8/2011 | Lim et al. | |
| 8,022,663 | B2 * | 9/2011 | Davis | B60L 7/24 320/104 |
| 8,120,308 | B2 * | 2/2012 | Ward | B60L 8/003 180/2.1 |
| 8,153,313 | B2 * | 4/2012 | Hu | H01M 8/0494 429/427 |
| 8,532,854 | B2 | 9/2013 | Tate, Jr. et al. | |
| 8,541,905 | B2 * | 9/2013 | Brabec | B60L 11/1861 307/10.7 |
| 8,698,448 | B2 * | 4/2014 | Dong | H02J 7/0003 320/101 |
| 8,729,865 | B2 * | 5/2014 | Scheucher | B60L 11/1861 320/107 |
| 8,749,193 | B1 * | 6/2014 | Sullivan | H02J 1/08 307/10.7 |
| 8,957,623 | B2 * | 2/2015 | Sisk | H01M 2/1072 320/101 |
| 8,963,365 | B2 * | 2/2015 | King | B60L 11/1857 307/10.1 |
| 8,975,859 | B2 * | 3/2015 | Takehara | H01M 10/44 320/101 |
| 9,172,252 | B2 * | 10/2015 | Sugiyama | B60L 1/006 |
| 9,240,704 | B2 * | 1/2016 | Wortberg | H02J 1/08 |
| 9,260,068 | B2 * | 2/2016 | Ohsumi | B60K 11/06 |
| 9,300,018 | B2 * | 3/2016 | Watson | H01M 2/1072 |
| 9,315,112 | B2 * | 4/2016 | Sugiyama | B60L 1/00 |
| 9,321,357 | B2 * | 4/2016 | Caldeira | B60L 11/1801 |
| 9,331,498 | B2 * | 5/2016 | Albsmeier | H02J 7/0013 |
| 9,382,892 | B2 * | 7/2016 | Sakata | B60R 16/033 |
| 9,425,492 | B2 * | 8/2016 | Mao | H01M 2/1072 |
| 9,527,401 | B2 * | 12/2016 | Le | H01M 10/441 |
| 9,527,402 | B2 * | 12/2016 | Wyatt | B60L 11/1868 |
| 9,627,908 | B2 * | 4/2017 | Kaminsky | H01G 9/28 |
| 9,682,629 | B2 * | 6/2017 | Saint-Leger | B60L 1/003 |
| 9,718,375 | B2 * | 8/2017 | Le | B60L 11/1877 |
| 9,793,722 | B2 * | 10/2017 | Tamura | B60R 16/033 |
| 9,819,064 | B2 * | 11/2017 | Jiang | H01M 2/1072 |
| 9,931,950 | B2 * | 4/2018 | Demure | B60L 1/003 |
| 10,020,485 | B2 * | 7/2018 | Wyatt | B60L 11/1868 |
| 10,062,892 | B2 * | 8/2018 | Wyatt | B60L 11/1868 |
| 10,158,152 | B2 | 12/2018 | Watson et al. | |
| 2001/0040060 | A1 * | 11/2001 | Morimoto | B60K 6/28 180/65.26 |
| 2001/0040441 | A1 * | 11/2001 | Ng | H02J 7/0032 320/104 |
| 2003/0105562 | A1 * | 6/2003 | Hsiao | B60L 58/40 701/22 |
| 2003/0118876 | A1 * | 6/2003 | Sugiura | B60L 11/1887 429/9 |
| 2003/0210014 | A1 * | 11/2003 | Jabaji | H02J 7/0031 320/104 |
| 2004/0053083 | A1 | 3/2004 | Kobayashi et al. | |
| 2004/0076860 | A1 * | 4/2004 | Aso | H01M 8/04589 429/430 |
| 2004/0232861 | A1 * | 11/2004 | Wakashiro | B60K 6/485 318/139 |
| 2005/0212491 | A1 * | 9/2005 | Colombo | H02J 7/0032 320/150 |
| 2006/0226811 | A1 * | 10/2006 | Seo | H02J 7/0026 320/116 |
| 2006/0234617 | A1 * | 10/2006 | Francis | B23D 59/001 452/174 |

(56) References Cited

U.S. PATENT DOCUMENTS

| | | | |
|---|---|---|---|
| 2007/0029986 A1* | 2/2007 | Nakamura | B60L 7/06 323/318 |
| 2007/0069586 A1* | 3/2007 | Queveau | B60L 1/003 307/66 |
| 2007/0139007 A1* | 6/2007 | Lim | G01R 31/3658 320/116 |
| 2007/0159007 A1* | 7/2007 | King | B60L 11/1864 307/71 |
| 2008/0111508 A1* | 5/2008 | Dasgupta | B60L 11/1809 318/139 |
| 2008/0143292 A1* | 6/2008 | Ward | B60L 8/003 320/101 |
| 2008/0203966 A1* | 8/2008 | Ward | H02J 7/355 320/104 |
| 2008/0290842 A1* | 11/2008 | Davis | B60L 7/24 320/166 |
| 2009/0243387 A1* | 10/2009 | Conen | H02J 1/10 307/10.1 |
| 2010/0090626 A1* | 4/2010 | King | B60L 7/16 318/376 |
| 2010/0133029 A1* | 6/2010 | Moran | H01M 8/04089 180/65.265 |
| 2010/0235030 A1* | 9/2010 | Xue | B60L 7/12 701/22 |
| 2010/0250043 A1* | 9/2010 | Scheucher | B60L 11/1861 701/22 |
| 2010/0289452 A1* | 11/2010 | Wagatsuma | B60K 6/28 320/109 |
| 2011/0001352 A1* | 1/2011 | Tamura | B60R 16/033 307/9.1 |
| 2011/0001442 A1 | 1/2011 | Lee et al. | |
| 2011/0012424 A1* | 1/2011 | Wortberg | H02J 1/08 307/10.1 |
| 2011/0080133 A1* | 4/2011 | Tamburrino | B60L 11/1851 320/101 |
| 2011/0089904 A1* | 4/2011 | Ward | B60L 8/003 320/126 |
| 2011/0175357 A1* | 7/2011 | Navetta | F02D 29/06 290/47 |
| 2011/0309791 A1* | 12/2011 | Mitake | B60L 11/1816 320/108 |
| 2012/0038216 A1* | 2/2012 | Berry | B60L 11/005 307/77 |
| 2012/0083948 A1* | 4/2012 | Tate, Jr. | B60L 58/12 701/22 |
| 2012/0112702 A1* | 5/2012 | Steigerwald | B60L 3/0069 320/137 |
| 2012/0123625 A1* | 5/2012 | Ueo | B60L 3/003 701/22 |
| 2012/0146572 A1* | 6/2012 | Ward | B60L 11/1809 320/101 |
| 2012/0169129 A1 | 7/2012 | Kim et al. | |
| 2012/0187759 A1* | 7/2012 | Kamichi | B60L 3/003 307/10.1 |
| 2012/0235473 A1* | 9/2012 | Jiang | H01M 2/1072 307/9.1 |
| 2012/0235511 A1* | 9/2012 | Watson | H01M 2/1072 307/109 |
| 2012/0235624 A1* | 9/2012 | Sisk | H01M 2/1072 320/101 |
| 2012/0235625 A1* | 9/2012 | Takehara | H01M 10/44 320/101 |
| 2012/0235642 A1* | 9/2012 | Mao | H01M 2/1072 320/112 |
| 2012/0237799 A1* | 9/2012 | Jiang | H01M 2/1072 429/7 |
| 2013/0116889 A1* | 5/2013 | Zhang | B60L 7/12 701/36 |
| 2013/0221896 A1* | 8/2013 | Dong | H02J 7/0003 320/101 |
| 2013/0229049 A1* | 9/2013 | Larsson | F02N 11/0814 307/9.1 |
| 2013/0249219 A1* | 9/2013 | Kim | H02J 7/007 290/36 R |
| 2013/0264875 A1* | 10/2013 | Kaminsky | H01G 9/28 307/52 |
| 2013/0266826 A1* | 10/2013 | Cowperthwaite | H01G 9/28 429/7 |
| 2013/0289854 A1* | 10/2013 | Takahashi | B60L 11/1809 701/112 |
| 2014/0011057 A1 | 1/2014 | Schaefer | |
| 2014/0028256 A1* | 1/2014 | Sugiyama | B60L 1/006 320/109 |
| 2014/0070760 A1* | 3/2014 | Albsmeier | H02J 7/1423 320/107 |
| 2014/0077771 A1* | 3/2014 | Yamashita | B60K 6/28 320/167 |
| 2014/0091767 A1* | 4/2014 | Tamura | B60R 16/033 320/126 |
| 2014/0184153 A1* | 7/2014 | Saint-Leger | H02J 7/00 320/108 |
| 2014/0203634 A1* | 7/2014 | Sugiyama | B60L 1/00 307/10.1 |
| 2014/0222274 A1* | 8/2014 | Sugiyama | E02F 9/2075 701/22 |
| 2014/0300181 A1 | 10/2014 | Winkler et al. | |
| 2014/0343776 A1* | 11/2014 | Ang | H01M 10/4257 701/22 |
| 2014/0361611 A1* | 12/2014 | Saint-Leger | B60L 1/003 307/10.1 |
| 2015/0035356 A1* | 2/2015 | Sakata | H02J 7/16 307/9.1 |
| 2015/0188207 A1* | 7/2015 | Son | H01M 16/00 429/9 |
| 2015/0191139 A1 | 7/2015 | Schindler et al. | |
| 2015/0202983 A1* | 7/2015 | Le | H01M 10/441 320/109 |
| 2015/0202984 A1* | 7/2015 | Wyatt | B60L 11/1868 320/109 |
| 2015/0202985 A1* | 7/2015 | Le | B60L 11/1877 307/9.1 |
| 2015/0232049 A1* | 8/2015 | Ohsumi | B60R 16/04 180/68.1 |
| 2015/0274025 A1* | 10/2015 | Demure | B60L 1/003 307/10.1 |
| 2015/0275841 A1* | 10/2015 | Sakata | B60R 16/033 123/179.28 |
| 2015/0321575 A1* | 11/2015 | Sakatani | H02J 7/1423 320/109 |
| 2016/0090001 A1* | 3/2016 | Nomoto | B60L 1/003 320/109 |
| 2016/0107526 A1* | 4/2016 | Jin | B60L 7/10 307/10.1 |
| 2016/0137092 A1* | 5/2016 | Thieme | B60L 11/1861 307/10.6 |
| 2016/0161566 A1* | 6/2016 | Chen | B60L 11/1864 320/109 |
| 2016/0176298 A1* | 6/2016 | Watson | H01M 2/1072 307/10.6 |
| 2017/0162851 A1* | 6/2017 | Wyatt | B60L 11/1868 |
| 2018/0138486 A1* | 5/2018 | Wyatt | B60L 11/1868 |

OTHER PUBLICATIONS

"Evaluating Self Discharge," Battery University, Published Online Aug. 8, 2013, Accessed Aug. 18, 2016, http://batteryuniversity.com/learn/article/elevating_self_discharge.*

"Battery Performance Characteristics," MPowerUK, Published Online Aug. 5, 2014, Accessed Aug. 18, 2016, web.archive.org/web/20140805181127/http://www.mpoweruk.com/performance.htm.*

"Latching Relays," Jeelabs, Published Online Jun. 22, 2011, Accessed Mar. 2, 2017, http://jeelabs.org/2011/06/22/latching-relays/.*

PCT/US2015/036992 International Search Report and Written Opinion dated Jan. 13, 2016.

(56) References Cited

OTHER PUBLICATIONS

Buchner, "Energiemanagement Strategien Fur Elektrische Energiebordnetze in Kraftfahrzeugen", Jul. 10, 2008, p. 108.

* cited by examiner

BATTERY SYSTEM BI-STABLE RELAY CONTROL

BACKGROUND

The present disclosure relates generally to the field of battery systems, and more particularly, to battery systems used in vehicular contexts, as well as other energy storage/expending applications.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

Vehicles generally use one or more battery systems to power features in the vehicle including the air conditioning, radio, alarm system, and other electronics. To reduce the amount of undesirable emissions products and improve the fuel efficiency of vehicles, improvements have been made to vehicle technologies. For example, some vehicles may utilize techniques, such as regenerative braking, to generate and store electrical power as the vehicle decelerates or coasts. More specifically, as vehicle reduces in speed, a regenerative braking system may convert mechanical energy into electrical energy, which may then be stored and/or used to power to the vehicle.

Often, a lithium ion battery may be used to facilitate efficiently capturing the electrical energy generated. More specifically, the lithium ion battery may capture/store electrical energy during regenerative braking and subsequently supply electrical energy to the vehicle's electrical system. However, as the lithium ion battery module operates, the operational parameters of both the lithium ion battery and a traditional lead-acid battery may change and affect performance.

Accordingly, it would be beneficial to improve control over operation of the battery system, for example, to manage the changes that may occur in the operational parameters of the lithium ion battery and the lead-acid battery.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to batteries and battery systems. More specifically, the present disclosure relates to various electrochemical and electrostatic energy storage technologies (e.g. lead-acid batteries, nickel-zinc batteries, nickel-metal hydride batteries, and lithium ion batteries). Particular embodiments are directed to dual chemistry battery modules that may be used in vehicular contexts (e.g., micro-hybrid vehicles) as well as other energy storage/expending applications (e.g., energy storage for an electrical grid).

More specifically, the dual chemistry battery modules may include a first battery utilizing a first battery chemistry and a second battery utilizing a second battery chemistry. The first battery and the second battery may be connected in various parallel architectures, such as passive or semi-passive architectures. For example, in a passive architecture, the first battery and the second battery may be directly coupled to the terminals of the battery module. To increase the amount of control over the battery module, in a semi-passive architecture, a bi-stable relay may be included between either the first battery or the second battery and the terminals of the battery module. The bi-stable relay may then be opened or closed to selectively connect either the first battery or the second battery.

Additionally, the battery chemistries used in the first battery and the second battery may be selected based on desired characteristics for each. For example, the first battery may utilize a lead-acid chemistry to supply large surges of current, which may be utilized to start (e.g., crank) an internal combustion engine. The second battery may utilize various battery chemistries (e.g., nickel manganese cobalt oxide, lithium manganese oxide/nickel manganese cobalt oxide, or lithium manganese oxide/lithium titanate) with a higher coulombic efficiency and/or a higher charge power acceptance rate (e.g., higher maximum charging voltage or charging current) than the first battery. As used herein, "coulombic efficiency" and "charge power acceptance rate" may be used interchangeably to describe charging efficiency. In other words, the second battery may be recharged more efficiently and at a faster rate, for example while capturing regenerative power. Accordingly, in some embodiments, the first battery may be the primary source of electrical power and the second battery may supplement the first battery, for example by capturing, storing, and distributing regenerative power.

Accordingly, in a first embodiment, a battery system includes a first battery coupled to an electrical system, in which the first battery includes a first battery chemistry, and a second battery selectively coupled to the electrical system via a bi-stable relay and in parallel with the first battery, in which the second battery includes a second battery chemistry that has a higher coulombic efficiency than the first battery chemistry. The bi-stable relay is configured to couple the second battery to the electrical system to enable the second battery to capture a majority of regenerative power generated during regenerative braking and to enable the second battery to supply the regenerative power to power the electrical system by itself or in combination with the first battery.

In another embodiment, a battery system includes a first battery selectively coupled to an electrical system via a bi-stable relay, in which the first battery includes a first battery chemistry, and a second battery directly coupled to the electrical system in parallel with the first battery, in which the second battery includes a second battery chemistry that has a higher charge power acceptance rate than the first battery chemistry. The bi-stable relay is configured to disconnect the first battery from the electrical system to enable the second battery to be charged at a voltage higher than the first battery maximum charging voltage during regenerative braking.

DRAWINGS

Various aspects of this disclosure may be better understood upon reading the following detailed description and upon reference to the drawings in which.

DETAILED DESCRIPTION

Figure 1:
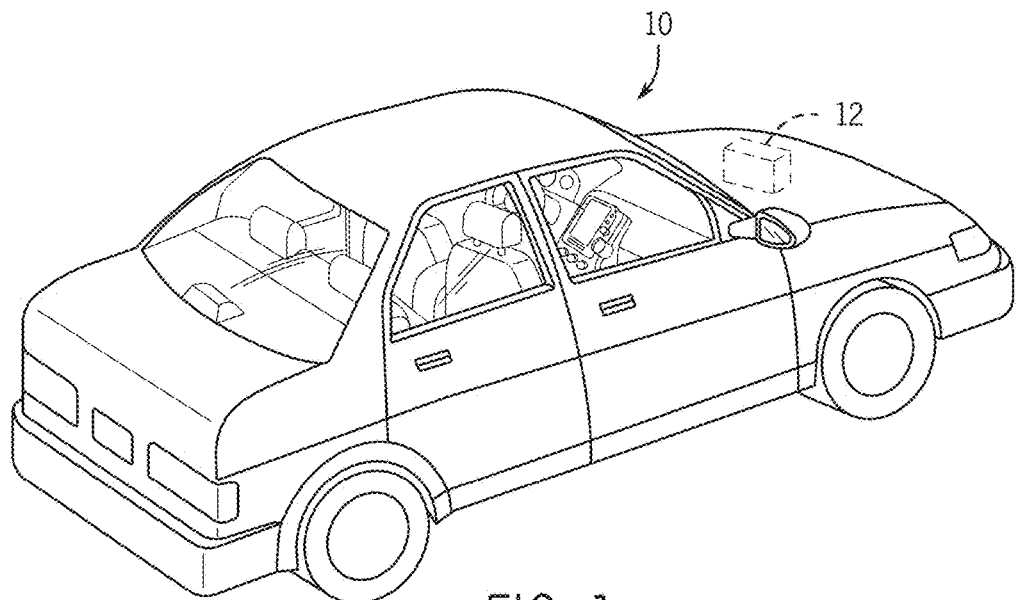
FIG. 1 is perspective view of a vehicle (an xEV) having a battery system contributing all or a portion of the power for the vehicle, in accordance with an embodiment of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, vehicle technology has improved to increase fuel economy and/or reduce undesirable emissions compared to more traditional gas-powered vehicles. For example, micro-hybrid vehicles disable the vehicle's internal combustion engine when the vehicle is idling. While the vehicle's internal combustion engine is disabled, the battery system may continue supplying power to the vehicle's electrical system, which may include the vehicle's radio, air conditioning, electronic control units, and the like. Additionally, regenerative braking vehicles capture and store electrical power generated when the vehicle is braking or coasting. In some embodiments, the generated electrical power may then be utilized to supply power to the vehicle's electrical system. In other embodiments, the generated electrical power may be utilized to stabilize voltage during high demand, for example in regenerative storage systems.

Based on the advantages over traditional gas-power vehicles, manufactures, which generally produce traditional gas-powered vehicles, may desire to utilize improved vehicle technologies (e.g., micro-hybrid technology or regenerative braking technology) within their vehicle lines. These manufactures often utilize one of their traditional vehicle platforms as a starting point. Generally, traditional gas-powered vehicles are designed to utilize 12 volt battery systems (e.g., voltage between 7-18 volts), such as a single 12 volt lead-acid battery. Accordingly, the single lead-acid battery may be adapted for the improved vehicle technologies. For example, the lead-acid battery may be utilized to capture and store regenerative power and/or supply power to the electrical system during auto-stop. However, in some embodiments, a lead-acid battery may be less efficient at capturing regenerative electrical power due to the lower coulombic efficiency and/or lower charge power acceptance rate associated with the lead-acid battery chemistry. As used herein, "coulombic efficiency" and "charge power acceptance rate" may be used interchangeably to describe charging efficiency and charging rate. Additionally, the lead-acid battery capacity may be increased to account for the electrical power demand during auto-stop, which may increase cost. As such, it would be beneficial to improve the efficiency of the power storage in the battery system and the efficiency of the power distribution to the vehicle's electrical system while largely conforming to existing vehicle electrical systems.

Accordingly, present embodiments include physical battery system features, and so forth, that facilitate providing improved 12 volt battery systems. As used herein, a "12 volt battery system" is intended to describe a battery system that supplies between 7-18 volts to an electrical system. For example, in some embodiments, the battery module may include multiple differing battery chemistries to improve the storage and distribution efficiency of the battery module. More specifically, as will be described in more detail below, the battery module may include a first battery (e.g., primary battery) with a first battery chemistry and a second battery (e.g., secondary battery) with a second battery chemistry. As used herein, "battery" is intended describe energy storage devices that utilize various chemical reactions to store and/or distribute electrical power. In some embodiments, the first battery and the second battery may operate in tandem. For example, the first (e.g., primary) battery may efficiently supply large amounts of current, for example to crank the internal combustion engine, and the second battery (e.g., power device) may efficiently capture and store a majority of power generated due to its higher coulombic efficiency and/or higher power charge acceptance rate. Additionally, the power stored in the second battery may be expended to provide power to the vehicle's electrical system. In other words, the first battery may be the primary source of electrical power and the second battery may supplement the battery, which in some embodiments may enable the storage capacity and/or the overall physical dimensions of the battery module to be reduced.

To facilitate supplementing the first battery with the second battery, the first battery and the second battery may be connected in various parallel architectures. For example, the battery module may utilize a passive architecture or a semi-passive architecture. As will be described in more detail below, in a passive architecture, the first battery and the second battery may be directly coupled to terminals of the battery module, which may reduce complexity of a control algorithm for the battery system. In a semi-passive architecture, one of the first battery and the second battery may be coupled to the terminals of the battery module via a bi-stable relay while the other may be directly coupled. In some embodiments, the bi-stable relay may increase the control over operation of the battery module by enabling either the first battery or the second battery to be selectively connected and disconnected. In some embodiments, utilizing the techniques described herein may increase fuel economy and reduce undesirable emissions by 3-5% as compared to auto-stop technology utilizing traditional 12 volt battery systems (e.g., a single 12 volt lead-acid battery) because the load on the alternator is reduced by more efficiently capturing regenerative power.

To help illustrate, FIG. 1 is a perspective view of an embodiment of a vehicle 10, which may utilize a regenerative braking system. Although the following discussion is presented in relation to vehicles with regenerative braking systems, the techniques described herein may be applied to other vehicles including xEV and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
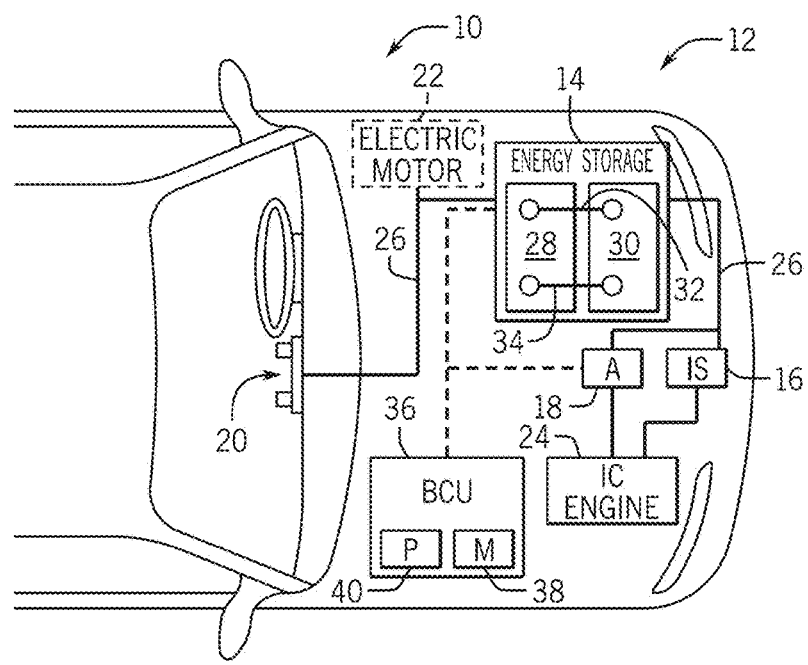
FIG. 2 is a cutaway schematic view of the xEV of FIG. 1 in the form of a hybrid electric vehicle (HEV), in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

More specifically, the energy storage component 14 may capture/store generated electrical energy and output electrical energy to power each of these components, as well as others. In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, the energy storage component 14 depicted in FIG. 2 supplies power to the vehicle console 20 and the ignition system 16 to start (e.g., crank) the internal combustion engine 24. In some embodiments, the ignition system 16 may include a traditional starter and/or a belt starter generator (BSG).

Additionally, the energy storage component 14 may capture electrical energy generated by the alternator 18 and/or an electric motor 22. In some embodiments, the alternator 18 may generate electrical energy while an internal combustion engine 24 is running. More specifically, the alternator 18 may convert the mechanical energy produced by the rotation of the internal combustion engine 24 into electrical energy. Additionally or alternatively, when the vehicle 10 includes the electric motor 22, the electric motor 22 may generate electrical energy by converting mechanical energy produced by the movement of the vehicle 10 (e.g., rotation of the wheels) into electrical energy. In other words, the energy storage component 14 may capture electrical energy generated during regenerative braking. Further, the alternator 18 may be a variable voltage alternator, and the energy generated by the alternator 18 during regenerative braking may include a greater voltage than a voltage of the energy generated by the alternator 18 through the internal combustion engine 24.

To facilitate capturing and supplying electric energy, the energy storage component 14 may be coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a first battery module 28 and a second battery module 30, which each includes one or more battery cells. In other embodiments, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

More specifically, in some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate supply of power from the battery system 12 to the various components in the vehicle's electrical system (e.g., HVAC system and vehicle console 20), the energy storage component 14 includes a first terminal 32 (i.e. a positive terminal) and a second terminal 34 (i.e., a ground terminal). In some embodiments, the second terminal 34 may provide a ground connection and the first terminal 32 may provide a positive voltage ranging between 8-18 volts. As previously noted, the battery module 14 may have dimensions comparable to those of a typical lead-acid battery to limit modifications to the vehicle 10 design to accommodate the battery system 12. For example, the battery module 14 may be of similar dimensions to an H6 battery, which may be approximately 13.9 inches×6.8 inches×7.5 inches. As depicted, the battery module 14 may be included within a single continuous housing. In other embodiments, the battery module 14 may include multiple housings coupled together (e.g., a first housing including the first battery and a second housing including the second battery). In still other embodiments, as mentioned above, the battery module 14 may include the first battery module 28 located under the hood of the vehicle 10, and the second battery module 30 may be located within the interior of the vehicle 10.

As depicted, the battery module 14 includes the first terminal 32, the second terminal 34, a first battery (e.g., a lead acid battery) 28, a second battery 30 (e.g., a lithium ion battery), and a battery control unit 36. As used herein, the battery control unit 36 generally refers to control components that control operation of the battery system 12, such as relays within the battery module or switches in the alternator 18. The operation of the battery module 14 may be controlled by the battery control unit 36. For example, the battery control unit 36 may regulate amount of electrical energy captured/supplied by each battery module 28 or 30 (e.g., de-rate and re-rate the battery system 12), perform load balancing between the batteries, control charging and discharging of the batteries (e.g., via relays or DC/DC converters), determine a state of charge of each battery and/or the entire battery module 14, activate an active cooling mechanism, and the like.

Accordingly, the battery control unit 36 may include one or more memory 38 and one or more processor 40 programmed to execute control algorithms for performing such tasks. More specifically, the one or more processor 40 may include one or more application specific integrated circuits (ASICs), one or more field programmable gate arrays (FPGAs), one or more general purpose processors, or any combination thereof. Additionally, the one or more memory 38 may include volatile memory, such as random access memory (RAM), and/or non-volatile memory, such as read-only memory (ROM), optical drives, hard disc drives, or solid-state drives. In some embodiments, the battery control unit 36 may include portions of a vehicle control unit (VCU) and/or a separate battery control module. Additionally, as depicted, the battery control unit 36 may be included separate from the battery module 14, such as a standalone module. In other embodiments, the battery control unit 36 may be included within the battery module 14.

Furthermore, as depicted, the first battery 28 and the second battery 30 are connected in parallel across the first terminal 32 and the second terminal 34 to enable charging and discharging of the batteries. As described above, the battery terminals 32 and 34 may output the power stored in the battery module 14 to provide power to the vehicle's electrical system. Additionally, the battery terminals 32 and 34 may also input power to the battery module 14 to enable the first battery 28 and the second battery 30 to charge, for example, when the alternator 18 generates electrical power through regenerative braking.

Moreover, as described above, the first battery 28 and the second battery 30 may utilize various parallel architectures including a passive architecture or a semi-passive architecture. For example, in FIG. 3, a passive battery system 42 is depicted, and in FIGS. 4A and 4B, a semi-passive architecture 50 is depicted. As depicted in each architecture, the first battery 28 and the second battery 30 are coupled in parallel with a starter (e.g., ignition system) 16, an alternator (e.g., regenerative braking system) 18, and the vehicle's electrical system 46 via the bus 26. Additionally, the first battery 28 and the second battery 30 are selectively connected to the ignition system 16 via a switch 48. As can be appreciated, the switch 48 may represent various mechanisms, such as solenoids, that enable the first battery 28 and/or the second battery 30 to start (e.g., crank) the internal combustion engine 24. As will be described in more detail below, the differences between the two architectures is the amount of control over the operation of each of the first battery 28 and the second battery 30.

Figure 3:
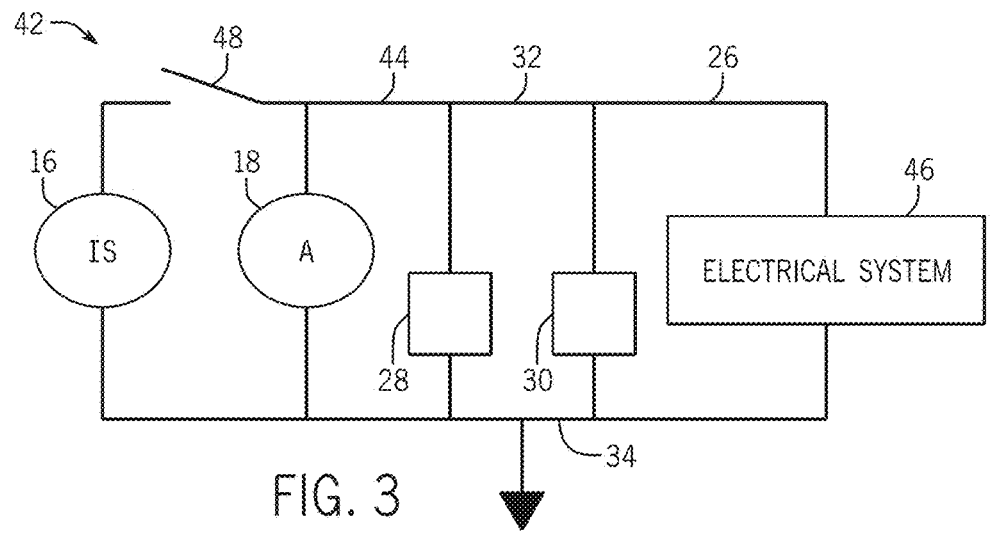
FIG. 3 is a schematic diagram of a passive battery architecture, in accordance with an embodiment of the present approach.

As depicted in the passive battery system 42 of FIG. 3, the first battery 28 and the second battery 30 are directly coupled to the bus 26. Accordingly, the operation of the first battery 28 and the second battery 30 may be controlled by the characteristics of each of the batteries. More specifically, the charging and discharging of the batteries 28 and 30 may be controlled by the current steering characteristics (e.g., internal resistance) of the first battery 28 (e.g., a lead-acid battery) and the second battery 30 (e.g., a lithium ion battery). For example, when the first battery 28 is fully charged or close to fully charged (e.g., generally full state of charge), the first battery 28 may have a high internal resistance that steers current toward the second battery 30. On the other hand, when the first battery 28 is less than fully charged, the current may be shared between the lead-acid battery 28 and the second battery 30. In other words, the internal resistance may be proportionally related to the battery state of charge (e.g., high state of charge high internal resistance). Additionally, when the second battery 30 has a higher open circuit voltage than the first battery 28, the second battery 30 may provide power by itself, for example to a vehicle electrical system 46, until it nears the open circuit voltage of the first battery. The exact voltage when the first battery 28 may begin providing power may be based on the various factors, such as the internal resistance of the batteries 28 and 30 and a diffusional resistance of the vehicle electrical system 46.

Further, as discussed above, the first battery 28 and the second battery 30 are selectively connected to the ignition system 16 via a switch 48. As can be appreciated, the switch 48 may represent various mechanisms, such as solenoids, that enable the first battery 28 (e.g., a lead-acid battery) and/or the second battery 30 to start (e.g., crank) the internal combustion engine 24.

Figure 4A:
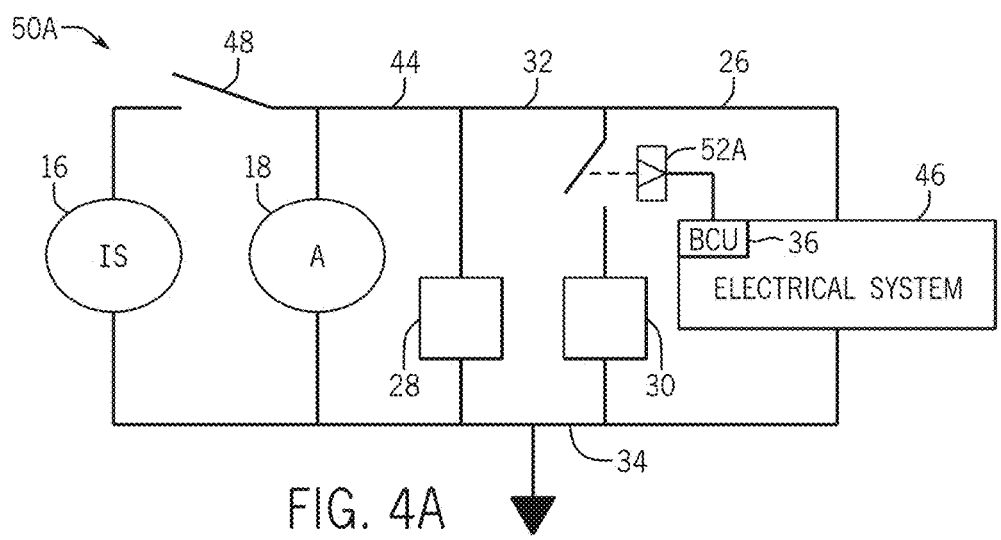
FIG. 4A is a schematic diagram of a semi-passive battery architecture with a bi-stable relay to selectively couple a second battery, in accordance with an embodiment of the present approach.
Figure 4B:
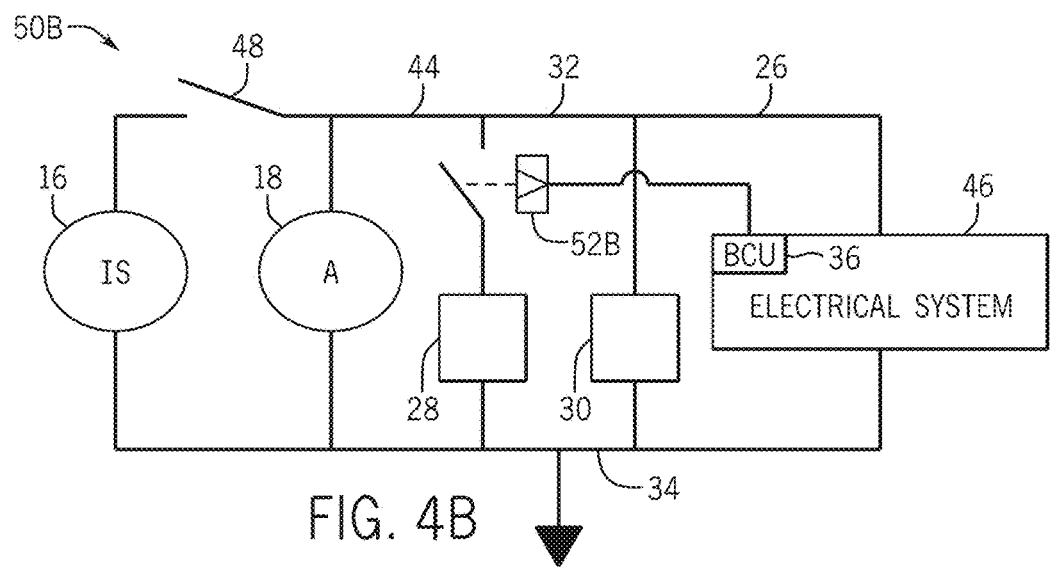
FIG. 4B is a schematic diagram of a semi-passive battery architecture with a bi-stable relay to selectively couple a first battery, in accordance with an embodiment of the present approach.

To increase the control over the operation of one of the batteries 28 or 30, a semi-passive architecture 50, as depicted in FIGS. 4A and 4B, may be utilized. More specifically, the semi-passive architecture 50 enables one of the batteries 28 or 30 to be selectively connected and disconnected from the bus 26. For example, FIG. 4A, depicts an embodiment of a semi-passive architecture 50A with a bi-stable relay 52A included between the second battery 30 and the first terminal 32 while the first battery 30 is directly connected to the terminal 32. As used herein, a "bi-stable relay" is intended to describe any mechanism that can selectively connect and disconnect a battery while maintaining a stable state in either a connected or disconnected position. For example, the bi-stable relay 52 may only consume power for an instant while the bi-stable relay 52 switches between positions. In contrast, a standard relay may continuously consume power while the relay is in either or both of an open position and a closed position. Therefore, the bi-stable relay 52 may minimize power consumed from the battery system 12. Further, it may be desirable to utilize the bi-stable relay 52 to minimize the risk of arcing, which may result from the use of a hardware switch.

In operation, the battery control unit 36 may monitor information from the vehicle 10 to determine appropriate times to open or close the bi-stable relay 52. For example, when the vehicle 10 transitions from a key-on to a key-off position, the battery control unit 36 may instruct the bi-stable relay 52A to remain closed. While the bi-stable relay 52A remains closed, any electrical loads on the vehicle 10 may be driven by the second battery 30 (e.g., a lithium ion battery) instead of the first battery 28 (e.g., a lead-acid battery). Therefore, due to the high coulombic efficiency of the second battery 30 relative to the first battery 28, the bi-stable relay 52A may enable the second battery 30 to continue powering the electrical system 46 of the vehicle 10 when the vehicle 10 is transitioned to the key-off position. Additionally, the battery control unit 36 may maintain a coupling of the second battery 30 to the electrical system 46 for a predetermined about of time (e.g., 2-5 minutes), or until the second battery 30 reaches a predetermined voltage or state of charge to maintain a minimum voltage or state of charge level after the vehicle 10 transitions to the key-off position.

In another embodiment, when the vehicle transitions from a long key-off position (i.e., in which the second battery 30 has been switched off of the bus 26 by the bi-stable relay 52A) to a key-on position, the battery control unit 36 may determine whether the voltage of the second battery 30 is lower than the voltage of the first battery 28. If so, the bi-stable relay 52A may remain in an off position until the engine starts under power of the first battery 28 and until the alternator 18 is able to begin charging the second battery 30 (e.g., during regenerative braking). On the other hand, if the voltage of the second battery 30 is greater than the voltage of the first battery at the key-on position, the bi-stable relay 52A may immediately switch closed to couple the second battery 30 into the passive parallel configuration with the first battery 28 to assist in starting the internal combustion engine 24. Further, if the battery control unit 36 determines that the voltage of the first battery 28 is too low to start the internal combustion engine 24 (i.e., the voltage of the first battery 28 is below a threshold voltage), the battery control unit 36 may close the bi-stable relay 52A to allow the second battery 30 to provide the starting power for the ignition system 16 (i.e., allow the second battery 30 to "jump" the vehicle 10).

Alternatively, FIG. 4B depicts an embodiment of a semi-passive architecture 50B with a bi-stable relay 52B included between the first battery 28 and the bus 26 while the second battery 30 is directly connected to the bus 26. In operation, the bi-stable relay 52B may be closed when it is desirable to charge or discharge the first battery 28. On the other hand, the bi-stable relay 52B may be open when the first battery 28 is neither charging nor discharging. In other words, current steering characteristics may control the operation of the second battery 30 while the battery control unit 36 may control the operation of the first battery 28 directly via the bi-stable relay 52B. It may be desirable to remove the first battery 28 from the bus 26 while the alternator 18 charges the second battery 30 during regenerative braking. By removing the first battery 28 from the bus 26, the first battery 28 may be protected from overvoltage applications of power that are undesirable for the first battery 28 and intended to charge the second battery 30.

Additionally, it may be desirable to open the bi-stable relay 52B to remove the first battery 28 from the bus 26 when a key-off position is received by the vehicle 10. In this situation, the first battery 28, which may generally be relied on to crank the internal combustion engine 24, may not be depleted by the various components of the electrical system 46 that remain active after the key-off position is received. Further, when the vehicle 10 receives a key-on position, the battery control unit 36 may instruct the bi-stable relay 52B to close. In closing the bi-stable relay 52B, the first battery 28 may be relied on to provide power to the ignition system 16 to crank the internal combustion engine 24.

Accordingly, in operation, the semi-passive architecture 50 embodiments may be similar to the passive battery system 42 embodiments. However, as will be described in further detail below, the semi-passive battery system architecture 50A may improve the reliability of the battery system by enabling the second battery 30 to be disabled (e.g., disconnected from the vehicle 10) when it is undesirable to charge and/or discharge the second battery 30. Additionally, the semi-passive architecture 50B may improve reliability of the battery system by enabling the first battery 28 to be disabled (e.g., disconnected from the vehicle 10) when it is undesirable to charge and/or discharge the first battery 28, for example to protect the first battery 28 from overvoltage. In other words, operation of one of the batteries 28 or 30 may be directly controlled by the battery control unit 36.

Figure 5:
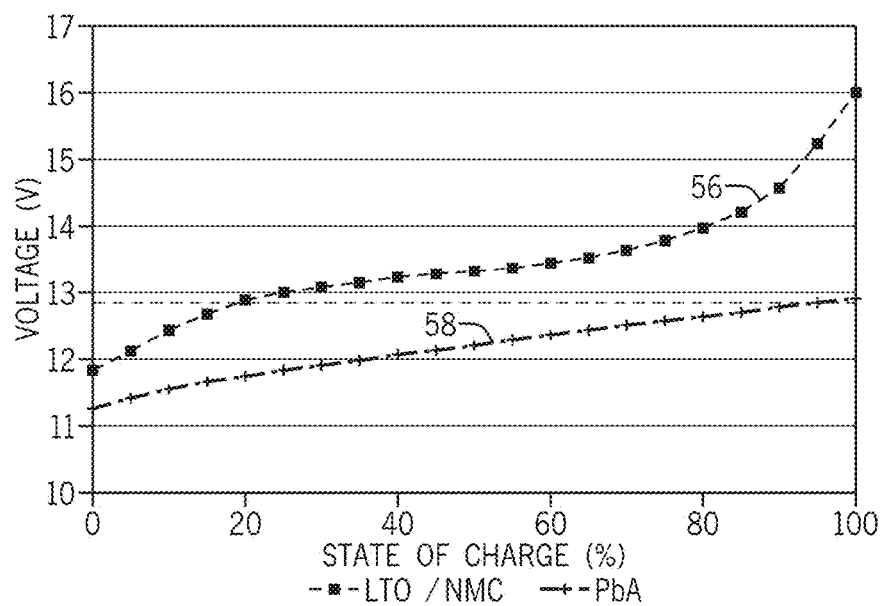
FIG. 5 is a graph illustrating voltage characteristics of partial voltage matched battery chemistries, in accordance with an embodiment of the present approach.

As mentioned above, different pairs of battery chemistries may be selected for the first and the second batteries 28 and 30. As such, FIG. 5 illustrates a plot 54 of battery voltage curves of two different battery chemistries that may be selected. In other words, a first battery chemistry may be selected for the first battery 28 and a second battery chemistry may be selected for the second battery 30. Depending on the chemistry pairings, the energy storage component 14 may function differently. More specifically, the chemistry pair selected may cause the first battery 28 and the second battery 30 to be non-voltage matched, partial voltage matched, or voltage matched. As used herein, "non-voltage matched" is intended to describe when the first battery 28 and the second battery 30 open circuit voltage ranges do not overlap, "partial voltage matched" is intended to describe when the first battery 28 and the second battery 30 open circuit voltage ranges partially overlap, for example when the voltage overlap corresponds to between 1-74% of the total state of charge range of the second battery 30, and "voltage matched" is intended to describe when the first battery 28 and the second battery 30 voltages largely overlap, for example when the voltage overlap corresponds to between 75-100% of the total state of charge range of the second battery 30. It should be noted that as described above, the second battery 30 has a higher coulombic efficiency and/or a higher charge power acceptance rate than the first battery 28. In other words, the battery pairing characteristics are described based on the relationship of the higher coulombic efficiency and/or a higher charge power acceptance rate battery (e.g., the second battery 30) to the other battery (e.g., the first battery 28).

Illustratively, voltage curves for an example of partial voltage matched batteries are depicted in FIG. 5, which is an XY plot depicting battery voltage curves. To simplify the following discussion, the first battery 28 will be described as a lead-acid battery and the second battery 30 will be described as a battery that utilizes a lithium ion battery chemistry. The voltage of each battery may vary with its state of charge (SOC). For example, a lead-acid battery 28 at 0% state of charge may have a voltage of 11.2 volts, at 50% state of charge may have a voltage of 12.2 volts, and at 100% state of charge may have a voltage of 12.9 volts. In other words, the lead-acid battery has a voltage range of 11.2-12.9 volts. Although the following discussion is made in reference to a lead-acid battery and a second battery, the present techniques may be applied to other battery pairings that have the same characteristics (e.g., non-voltage matched, partial voltage matched, or non-voltage matched).

As depicted, when the second battery 30 is a lithium-titanate/lithium nickel manganese cobalt oxide (LTO/NMC) battery, the lead-acid (PbA) battery 28 and the second battery 30 are partial voltage matched because an LTO/NMC voltage curve 56 and a PbA voltage curve 58 partially overlap. In other words, depending on their respective states of charge, the open circuit voltage of the lead acid battery 28 and the second battery 30 may be the same. To help illustrate, the lead-acid battery 28 has an open circuit voltage range of 11.2-12.9 volts and the LTO/NMC battery 30 has an open circuit voltage range between 11.8-16 volts. As described above, the first battery 28 and the second battery 30 may be partial voltage matched when the voltage overlap corresponds to between 1-74% of the second battery's total state of charge range. In the depicted embodiment, the first battery 28 and the second battery 30 may overlap between 11.8-12.9 volts. For example, when the second battery 30 is at a 20% state of charge and the lead-acid battery 28 is at a 100% state of charge, both will have a voltage of approximately 12.9 volts. In other words, the voltages may overlap when the second battery 30 is between 0-20% state of charge (e.g., 20% of the total state of charge range). Further, other battery chemistries for the second battery 30 may also partially overlap with the lead-acid battery 28. For example, the second battery 30 may include a battery chemistry of lithium-titanate at an anode of the second battery 30 and a blend of NMC and lithium cobalt oxide (LCO) at a cathode of the second battery 30. Furthermore, in other embodiments, the batteries 28 and 30 may also be non-voltage matched or voltage matched with the lead-acid battery 28 depending on the chemistry of the second battery 30.

As will be described in more detail below, the voltage pairing (e.g., non-voltage match, partial-voltage match, or voltage match) selected may determine the operation of the batteries 28 and 30 within the vehicle 10. Additionally, as described above, the lead-acid battery 28 and the second battery 30 are connected in various parallel architectures within the energy storage component 14. Accordingly, when the energy storage component 14 is coupled to the vehicle 10, the lead-acid battery 28 and the second battery 30 are also connected in parallel with the rest of the vehicle, such as the ignition system 16, the alternator 18 (e.g., the regenerative braking system), and the electrical system 46 of the vehicle 10.

Figure 6:
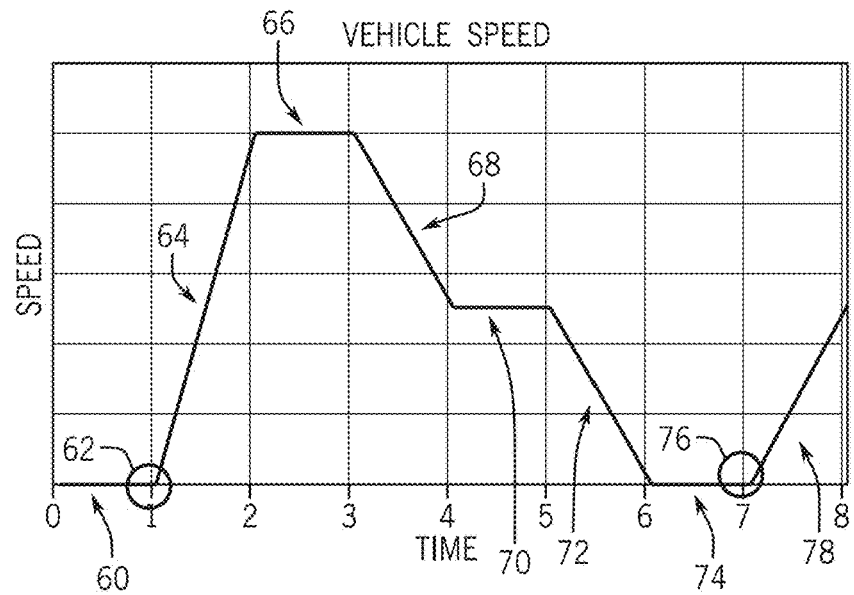
FIG. 6 is a graph describing various hypothetical operations of a vehicle over time, in accordance with an embodiment of the present approach.

To help illustrate the functional differences between voltage pairings, each of the voltage pairings will be described in relation to a hypothetical operation of the vehicle 10 as described in FIG. 6. FIG. 6 is an XY plot that describes various vehicle operations between time 0 and time 8, in which the Y-axis is vehicle speed and the X-axis is time (i.e., time 0 to time 8). More specifically, between time 0 and time 1, the vehicle 10 is key-off 60. As used herein, "key-off" is intended to describe when an operator (e.g., a driver) is not using the vehicle 10. For example, key-off 60 may describe when the vehicle 10 is parked in a garage overnight. During key-off 60, the internal combustion engine 24 is disabled and the battery system 12 continues to provide power to components of the vehicle's electrical system 46 that remain in operation even when the operator is away, such as an alarm system or engine control unit. Accordingly, as depicted, the vehicle has no speed.

At time 1, the vehicle 10 is cold cranked 62. As used herein, "cold crank" is intended to describe when an operator starts (i.e., cranks) the internal combustion engine 24 from key-off 60. Accordingly, during cold crank 62, the battery system 12 supplies power to the ignition system 16 (e.g., starter) to start the internal combustion engine 24.

After the internal combustion engine 24 is started, between time 1 and 2, the vehicle 10 accelerates 64. Accordingly, as depicted, the vehicle 10 increases speed. Between time 2 and time 3, the vehicle 10 cruises 66. Accordingly, as depicted, the vehicle 10 remains at a relatively constant speed. While the vehicle 10 accelerates 64 and cruises 66, the battery system 12 supplies power to the vehicle's electrical system 46, which may include the HVAC system and the vehicle console 20. To recharge the battery system 12, the alternator 18 may periodically be turned on, which, as will be described in more detail below, may result in micro-cycles. It should be noted that the embodiments described below may micro-cycle a battery 28 or 30 to achieve a target state of charge; however, additionally or alternatively, in other embodiments, the alternator 18 may supply power directly to the vehicle's electrical system 46 while the vehicle 10 is accelerating 64 and/or cruising 66 without micro-cycling the battery 28 or 30. In other words, the alternator 18 may supply power directly to the vehicle's electrical system, for example while the vehicle 10 accelerates 64 or cruises 66.

Between time 3 and time 4, the vehicle 10 decelerates and generates electrical power via regenerative braking 68. Accordingly, as depicted, the vehicle 10 reduces speed. More specifically, the kinetic energy (e.g., motion of the vehicle) is converted into electrical power through the alternator 18. The generated electrical power may be stored by the battery system 12 and/or distributed to supply power to the vehicle's electrical system 46. As will be described in more detail below, depending on the configuration of the battery system 12, the generated electrical power may be stored in and distributed from the first battery 28, the second battery 30, or both. Between time 4 and time 5, the vehicle 10 again cruises 70, and between time 5 and 6, the vehicle 10 again decelerates and generates electrical power via regenerative braking 72.

Between time 6 and time 7, the vehicle 10 enters auto-stop 74. As described above, during auto-stop 74, the internal combustion engine 24 is disabled while the vehicle 10 is idle. Accordingly, as depicted, the vehicle has no speed. From auto-stop 74, to resume driving the vehicle, the battery system 12 warm cranks 76 the internal combustion engine 24. As used herein, "warm crank" is intended to refer to starting (i.e., cranking) the internal combustion engine 24 from auto-stop 74. As will be described further below, the power used to warm crank 76 the internal combustion engine 24 may be less than the power to cold crank 62. After the internal combustion engine 24 is started (i.e., cranked), the vehicle 10 again accelerates 78 between time 7 and time 8.

While the vehicle is in auto-stop 74, the battery system 12 continues to supply power to the vehicle's electrical system 46. Additionally, this may include supplying power to the ignition system 16 to warm crank 76 the internal combustion engine 24. However, while in auto-stop 74, because the internal combustion engine 24 is disabled, the battery system 12 is not charged by the alternator 18. Accordingly, as described above, it may be beneficial to improve the efficiency of the battery system 12 in storing (e.g., capturing) generated electrical power during regenerative braking (e.g., 68 or 72). Additionally, it may be beneficial to improve the efficiency of the battery system in distributing (e.g., supplying) stored electrical power during various vehicle operations (e.g., cruising 70, auto-stop 74, warm cranking 76, and/or acceleration 78).

As discussed above, to help illustrate the difference between each of the voltage pairings (e.g., non-voltage match, partial voltage match, and voltage match), the operation of the battery system 12 utilizing each of the voltage pairings will be described below with regard to the hypothetical vehicle operation described in FIG. 6. Further, to simplify the following discussion, the battery system 12 will be discussed in relation to an energy storage component 14 that includes both the lead-acid battery 28 and the second battery 30. However, in other embodiments, the lead-acid battery 28 and the second battery 30 may be located in different regions of the vehicle 10, for example as separate modules.

With the preceding in mind, FIGS. 7A-7D describe the illustrative voltage of the semi-passive battery architecture 50A, depicted in FIG. 4A, in relation to the hypothetical vehicle operation described above in FIG. 6. FIGS. 7A-7D are XY plots that each includes a voltage curve that describes the dynamic voltage of the semi-passive architecture 50A and a second battery voltage curve that describes the dynamic voltage of the second battery 30 between time 0 and time 8, in which voltage is on the Y-axis and time is on the X-axis. More specifically, FIG. 7A describes a semi-passive architecture 50A with a non-voltage matched battery pairing, FIG. 7B describes a semi-passive architecture 50A with a first embodiment of a partial voltage matched battery pairing, FIG. 7C describes a semi-passive architecture 50A with a second embodiment of a partial voltage matched battery pairing, and FIG. 7D describes a semi-passive architecture 50A with a voltage matched battery pairing. As should be appreciated, since the lead-acid battery 28 is directly connected to the bus 26, the battery system voltage will be the same as the lead-acid battery voltage.

Non-Voltage Matched

Functionally, the semi-passive embodiments (e.g., non-voltage match, first embodiment partial voltage match, second embodiment partial voltage match, voltage match) are similar to their respective passive battery system embodiments. Accordingly, to more efficiently capture electrical power generated via regenerative braking, the lead-acid battery 28 may generally be operated between 95-100% state of charge and the second battery 30 may generally be operated at 0% state of charge. In other words, the lead-acid battery 28 is maintained at a relatively full state of charge to steer the generated electrical power to the second battery 30, and the second battery 30 is maintained at a relatively empty state of charge to utilize the full storage capacity (i.e., 0-100% state of charge) of the second battery 30.

Figure 7A:
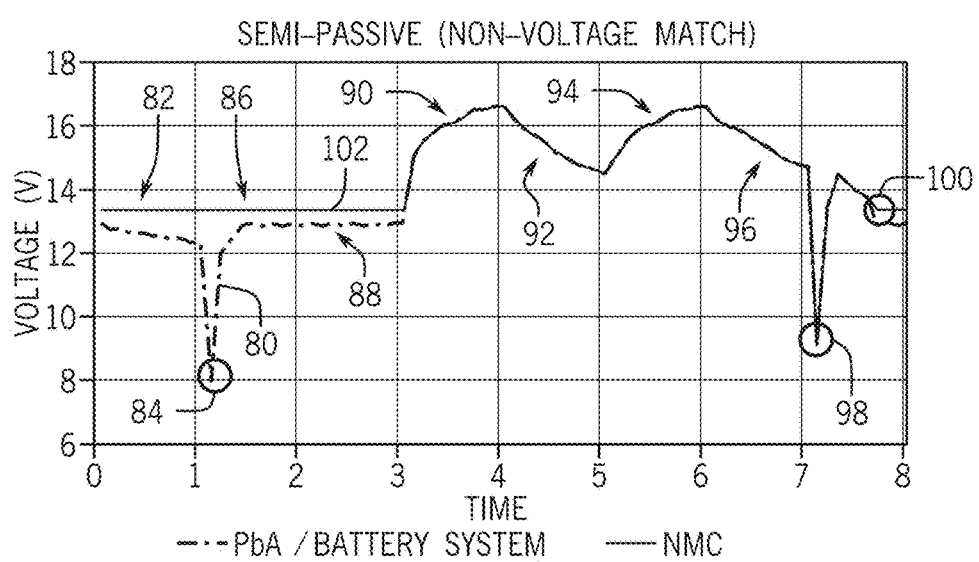
FIG. 7A is a graph illustrating the voltage of a semi-passive battery system with non-voltage matched battery chemistries for the vehicle described in FIG. 6, in accordance with an embodiment of the present approach.

For example, FIG. 7A depicts that the battery system voltage 80 decreases as the lead-acid battery supplies electrical power to the component of the electrical system 46 during key-off 82 (e.g., between time 0 and time 1), sharply drops as the lead-acid battery 28 cold cranks 84 the internal combustion engine 24 (e.g., at time 1), micro-cycles while the vehicle accelerates 86 and cruises 88 (e.g., between time 1 and time 3), increases as electrical power is stored in the second battery 30 during regenerative braking 90 (e.g., between time 3 and time 4), decreases as the second battery 30 supplies electrical power to the electrical system 46 during cruising 92 (e.g., between time 4 and time 5), increases as electrical power is again stored in the second battery 30 during regenerative braking 94 (e.g., between time 5 and time 6), decreases as the second battery 30 supplies electrical power to the electrical system 46 during auto-stop 96 (e.g., between time 6 and time 7), sharply drops to warm crank 98 the internal combustion engine 24 (e.g., at time 7), decreases until the electrical power stored in the second battery 30 is depleted 100 or nearly depleted, and micro-cycles thereafter (e.g., micro-cycling during acceleration 86 and cruising 88).

More specifically, as described above, the bi-stable relay 52A may be closed when it is desirable to charge or discharge the second battery 30. For example, between time 0 and time 3 (e.g., key-off 82, cold crank 84, acceleration 86, and cruising 88), the bi-stable relay 52A may be open to enable the lead-acid battery 28 to supply electrical power to the electrical system 46 by itself. Accordingly, as depicted, voltage 102 of the second battery is maintained at approximately 13.3 volts (e.g., 0% state of charge). Additionally, between time 3 and time 7 (e.g., regenerative braking 90, cruising 92, regenerative braking 94, auto-stop 96, and warm-crank 98), the bi-stable relay 52A may be closed to enable the second battery 30 to charge, for example during regenerative braking 90 and 94, and discharge for example during cruising 92 and auto-stop 96. Furthermore, the bi-stable relay 52A may remain closed until the electrical power stored in the second battery 30 is depleted 100. Accordingly, since the second battery 30 contains approximately 60% state of charge, the lead-acid battery 28 along with the second battery 30 may both supply power to warm crank 98 the internal combustion engine as depicted. More specifically, whether to utilize the second battery 30 to crank the internal combustion engine may be based at least in part on a minimum state of charge for the second battery. In some embodiments, the minimum state of charge may be 20%, 40%, or 60% of second battery state of charge. As used herein, "minimum state of charge" is intended to describe the minimum amount of power, which is a function of the battery state of charge, which may be contributed by the second battery 30 to facilitate a vehicle operation, such as crank the internal combustion engine 24 or supply power to the electrical system 46. Once the second battery 30 is depleted, the bi-stable relay 52A may be open, disconnecting the second battery 30 and enabling the lead-acid battery 28 to supply power to the electrical system 46 by itself.

First Embodiment Partial Voltage Matched

Figure 7B:
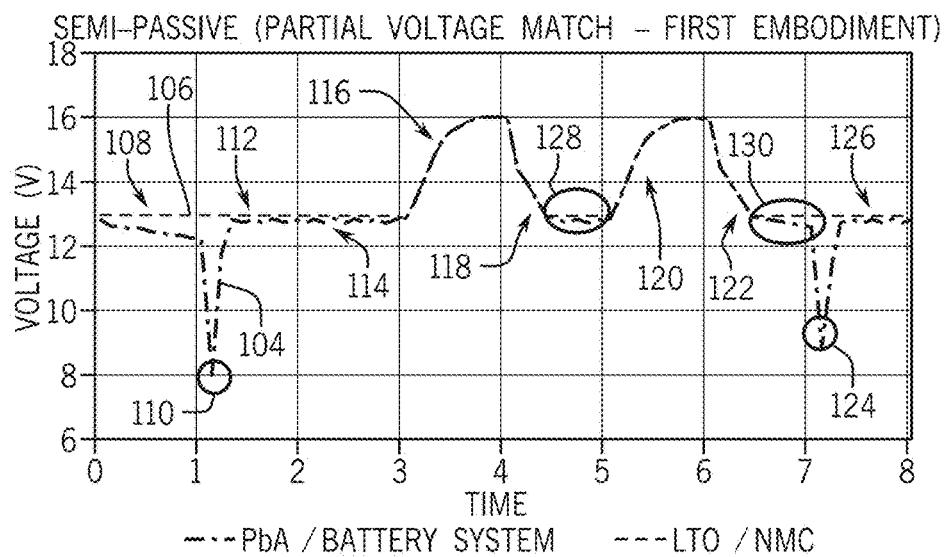
FIG. 7B is a graph illustrating the voltage of a first embodiment of a semi-passive battery system with partial voltage matched battery chemistries for the vehicle described in FIG. 6, in accordance with an embodiment of the present approach.

As described above, FIG. 7B describes a semi-passive battery system 50A when the batteries 28 and 30 are partial voltage matched, in accordance with a first embodiment. FIG. 7B depicts a battery system voltage curve 104 and a second battery voltage curve 106, in accordance with the first embodiment. More specifically, the voltage curves 104 and 106 are based on the voltage characteristics described in FIG. 5. In other words, a lead-acid battery 28 and a LTO/NMC battery 30.

As discussed above regarding the non-voltage match pair, the lead-acid battery 28 may be operated between 95-100% state of charge to steer regenerative power toward the second battery 30, which may capture regenerative power more efficiently. Additionally, based on the voltage characteristics of the batteries 28 and 30 (e.g., current steering), the second battery 30 may supply power by itself until its voltage nears the lead-acid battery voltage. As used herein, that voltage may be referred to as the "threshold voltage." Accordingly, in the present embodiment, because the lead-acid battery 28 is operated between 95-100% state of charge, the second battery 30 may supply power to the electrical system 46 by itself until it nears a voltage threshold of approximately 12.9 volts, at which point, the lead-acid battery 28 or both the lead-acid battery 28 and the second battery 30 may supply power to the electrical system 46. In other words, the lead-acid battery 28 may begin outputting electrical power once the second battery 30 decreases to approximately 20% state of charge. Thus, only a portion of the storage capacity of the second battery 30 is utilized. For example, in the present example, 80% (e.g., between 20-100% state of charge) of the storage capacity of the second battery 30 may be utilized. As used herein, the "first embodiment" of a partial voltage match battery system is intended to describe maintaining the battery 28 (e.g., lead-acid battery) generally at a full state of charge (e.g., 100% state of charge) and maintaining the second battery 28 at the state of charge corresponding with the threshold voltage (e.g., 20% state of charge).

Similar to FIG. 7A, the battery system voltage 104 decreases as the lead-acid battery 28 supplies electrical power to the electrical system 46 during key-off 108 (e.g., between time 0 and time 1), sharply drops as the lead-acid battery 28 cold cranks 110 the internal combustion engine (e.g., at time 1), micro-cycles (e.g., to maintain the lead-acid battery 28 between 95-100% state of charge) while the vehicle accelerates 112 and cruises 114 (e.g., between time 1 and time 3), increases as electrical power is stored in the second battery 30 during regenerative braking 116 (e.g., between time 3 and time 4), decreases as the battery system supplies electrical power to the electrical system 46 during cruising 118 (e.g., between time 4 and time 5), increases as electrical power is again stored in the second battery 30 during regenerative braking 120 (e.g., between time 5 and time 6), decreases as the battery system supplies electrical power to the electrical system 46 during auto-stop 122 (e.g., between time 6 and time 7), sharply drops as the lead-acid battery 28 warm cranks 124 the internal combustion engine 24 (e.g., at time 7), and micro-cycles after the electrical power stored in the second battery 30 is depleted or nearly depleted (e.g., during acceleration 126).

More specifically, similar to the semi-passive non-voltage match described above, in the depicted embodiment, the bi-stable relay 52A is open between time 0 and time 3 (e.g., key-off 108, cold crank 110, acceleration 112, and cruising 114) to enable the lead-acid battery 28 to supply power to the electrical system 46 by itself. Additionally, the bi-stable relay 52A may open after the second battery 30 has discharged to the threshold voltage. For example, in the depicted embodiment, the bi-stable relay 52A is open during micro-cycling 128 and discharging 130 to disconnect the second battery 30 from the electrical system 46. Accordingly, as depicted, the second battery voltage 106 remains relatively constant during these periods. As can be appreciated, the second battery voltage 106 may experience some decay due to voltage relaxation and/or self-discharge. Furthermore, in the depicted embodiment, since the bi-stable relay 52A is open, the lead-acid battery 28 supplies power to warm crank 124 the internal combustion engine 24 by itself.

On the other hand, the bi-stable relay 52A may be closed to enable the second battery 30 to charge/discharge. For example, in the depicted embodiment, the bi-stable relay 52A is closed during regenerative braking 116 and 120 to charge the second battery 30. Additionally, the bi-stable relay 52A is closed while the second battery 30 supplies power, for example during the portion of cruising 118 and auto-stop 122 before reaching its threshold voltage (e.g., before micro-cycling 128 and discharging 130). More generally, the bi-stable relay 52A may be closed when electrical power is desired by the electrical system 46 and the second battery 30 is above a minimum state of charge.

Second Embodiment Partial Voltage Matched

Based on the above description of the first embodiment of the semi-passive battery architecture 50A with partial voltage matched batteries, the amount of regenerative power utilized by the second battery 30 may be less than its full storage capacity. Accordingly, in a second embodiment of a semi-passive battery architecture 50A with partial voltage matched batteries, the threshold voltage may be reduced to increase the amount of regenerative power that may be captured and supplied by the second battery 30. For example, the threshold voltage is lowered to approximately 12.6 volts in the second embodiment described in FIG. 7C, which depicts a battery system voltage curve 132 that describes the voltage of the battery system 12 and a second battery voltage curve 134 that describes the voltage of the second battery 30. More specifically, the voltage curves 132 and 134 are based on the voltage characteristics described in FIG. 5. In other words, the lead-acid battery 28 is generally maintained at between 80-85% state of charge and the second battery 30 is generally maintained at 15% state of charge. Accordingly, in the second embodiment, the second battery 30 may utilize 85% of its storage capacity (e.g., 15-100% state of charge) to capture regenerative power, which is a 5% state of charge increase over the first embodiment (e.g., 80%). In other embodiments, the threshold voltage may be lowered by maintaining the lead-acid battery 28 between 50-55%, 55-60%, 60-65%, 65-70%, 70-75%, 85-90% state of charge, or any combination thereof. As used herein, the "second embodiment" of a partial voltage match battery system is intended to describe maintaining the first battery 28 (e.g., lead-acid battery) at a generally less than full state of charge (e.g., between 80-85% state of charge) to lower the threshold voltage.

Similar to FIG. 7B, the battery system voltage 132 decreases as the lead-acid battery 28 supplies electrical power to the component of the electrical system 46 during key-off 136 (e.g., between time 0 and time 1), sharply drops as the lead-acid battery 28 cold cranks 138 the internal combustion engine (e.g., at time 1), micro-cycles (e.g., to maintain the lead-acid battery between 80-85% state of charge) while the vehicle accelerates 140 and cruises 142 (e.g., between time 1 and time 3), increases as electrical power is stored in the second battery 30 during regenerative braking 144 (e.g., between time 3 and time 4), decreases as the second battery 30 supplies electrical power to the electrical system 46 during cruising 146 (e.g., between time 4 and time 5), increases as electrical power is again stored in the second battery 30 during regenerative braking 148 (e.g., between time 5 and time 6), decreases as the second battery 30 supplies electrical power to the electrical system 46 during auto-stop 150 (e.g., between time 6 and time 7), sharply drops to warm crank 152 the internal combustion engine 24 (e.g., at time 7), and micro-cycles after the electrical power stored in the Second battery 30 is depleted or nearly depleted (e.g., during acceleration 154).

More specifically, similar to the first semi-passive partial voltage match embodiment described above, in the depicted embodiment, the bi-stable relay 52A is open between time 0 and time 3 (e.g., key-off 136, cold crank 138, acceleration 140, and cruising 142) to enable the lead-acid battery 28 to supply power to the electrical system 46 by itself. Additionally, the bi-stable relay 52A may open after the second battery 30 has discharged to the threshold voltage. For example, in the depicted embodiment, the bi-stable relay 52A opens to disconnect the second battery 30, and the lead-acid battery 28 provides power (e.g., during micro-cycling 156). Accordingly, as depicted, the second battery voltage 134 remains at a relatively constant voltage during these periods. Furthermore, since the second battery 30 has not reached the threshold voltage, the second battery 30 along with the lead-acid battery 28 may both supply power to warm crank 152 the internal combustion engine 24.

On the other hand, the bi-stable relay 52A may be closed to enable the second battery 30 to charge/discharge. For example, in the depicted embodiment, the bi-stable relay 52A is closed during regenerative braking 144 and 148 to charge the second battery 30. Additionally, the bi-stable relay 52A is closed while the second battery 30 supplies power, for example during cruising 146 and auto-stop 150.

Voltage Matched

Furthermore, as described above, FIG. 7D describes a semi-passive architecture 50A when the batteries 28 and 30 are voltage matched. In other words, a lead-acid battery 28 and a LTO/LMO battery 30, for example. As depicted, FIG. 7D depicts a battery system voltage curve 158 that describes the voltage of the battery system and a second battery voltage curve 160 that describes the voltage of the second battery 30. As described above, the second battery 30 may supply power to the electrical system 46 by itself until the second battery 30 nears the threshold voltage. Accordingly, similar to the second embodiment of the partial voltage match described above, the threshold voltage may be reduced to increase the storage capability of the second battery 30. Illustratively, if the threshold voltage is approximately 12.9 volts, the lead-acid battery 28 is generally maintained at between 95-100% state of charge and the second battery 30 is maintained at approximately 75% state of charge. In other words, the second battery 30 is capable of utilizing 25% of its storage capacity to capture regenerative power (e.g., 75-100% state of charge). Comparatively, if the threshold voltage is reduced to approximately 12.3 volts, the lead-acid battery 28 is generally maintained at between 60-65% state of charge (e.g., generally less than full state of charge) and the second battery 30 is generally maintained at 35% state of charge. Accordingly, the second battery 30 is capable of utilizing 65% of its storage capacity to capture regenerative power (e.g., 35-100% state of charge).

Figure 7C:
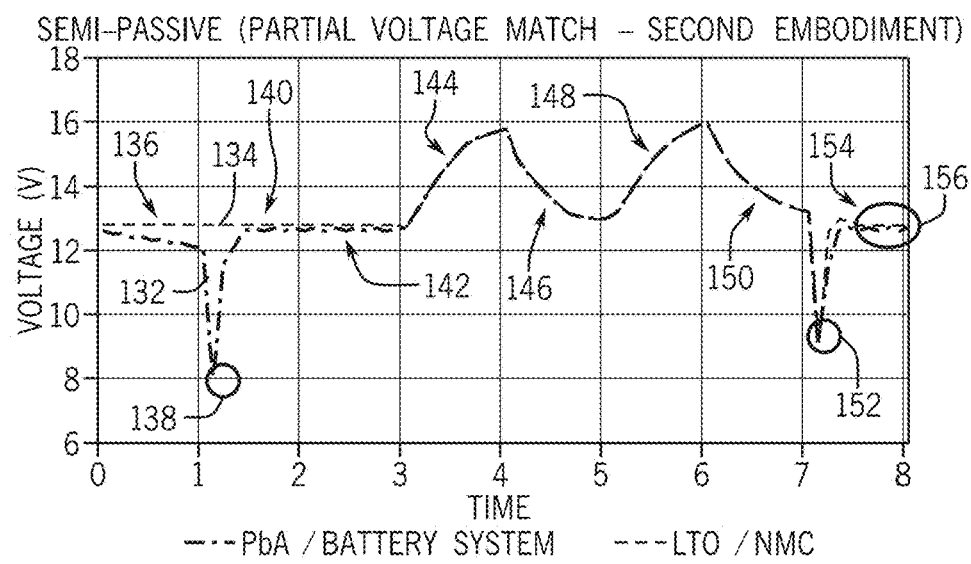
FIG. 7C is a graph illustrating the voltage of a second embodiment of a semi-passive battery system with partial voltage matched battery chemistries for the vehicle described in FIG. 6, in accordance with an embodiment of the present approach.
Figure 7D:
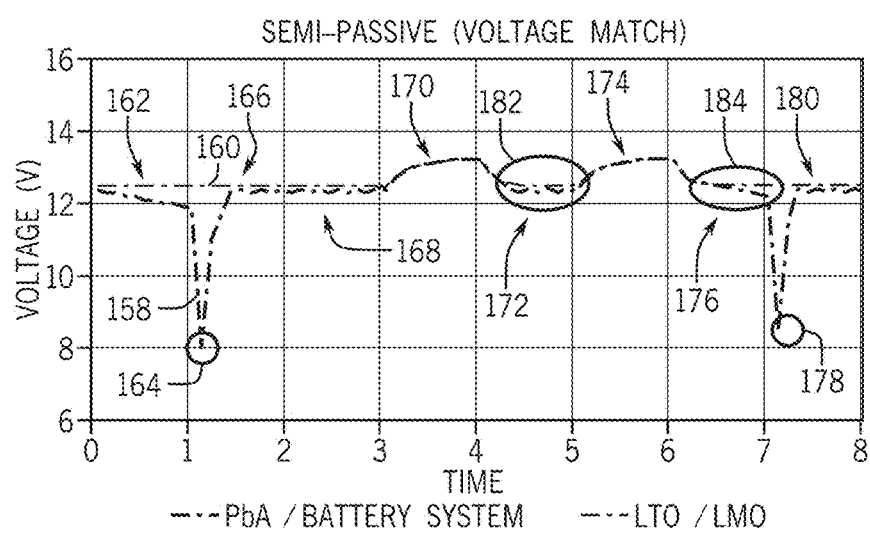
FIG. 7D is a graph illustrating the voltage of a semi-passive battery system with voltage matched battery chemistries for the vehicle described in FIG. 6, in accordance with an embodiment of the present approach.

Similar to FIG. 7C, above, the battery system voltage 158 decreases as the lead-acid battery 28 supplies electrical power to the component of the electrical system 46 during key-off 162 (e.g., between time 0 and time 1), sharply drops as the lead-acid battery 28 cold cranks 164 the internal combustion engine (e.g., at time 1), micro-cycles (e.g., to maintain the lead-acid battery between 60-65% state of charge) while the vehicle accelerates 166 and cruises 168 (e.g., between time 1 and time 3), increases as electrical power is stored in the second battery 30 during regenerative braking 170 (e.g., between time 3 and time 4), decreases as the battery system supplies electrical power to the electrical system 46 during cruising 172 (e.g., between time 4 and time 5), increases as electrical power is again stored in the second battery 30 during regenerative braking 174 (e.g., between time 5 and time 6), decreases as the battery system supplies electrical power to the electrical system 46 during auto-stop 176 (e.g., between time 6 and time 7), sharply drops as the lead-acid battery warm cranks 178 the internal combustion engine 24 (e.g., at time 7), and micro-cycles after the electrical power stored in the second battery 30 is depleted or nearly depleted (e.g., during acceleration 180).

More specifically, similar to the semi-passive embodiments described above, in the depicted embodiment, the bi-stable relay 52A is open between time 0 and time 3 (e.g., key-off 162, cold crank 164, acceleration 166, and cruising 168) to enable the lead-acid battery 28 to supply power to the electrical system 46 by itself. Additionally, the bi-stable relay 52A may open after the second battery 30 has discharged to the threshold voltage. For example, in the depicted embodiment, when the threshold voltage is reached, the bi-stable relay 52A opens to disconnect the Second battery 30 during micro-cycling 182 or discharging 128. Accordingly, as depicted, the LTO/LMO battery voltage 160 remains at a relatively constant voltage during these periods. Furthermore, in the depicted embodiment, since the bi-stable relay 52A is open, the lead-acid battery 28 supplies power to warm crank 178 the internal combustion engine 24 by itself.

On the other hand, the bi-stable relay 52A may be closed to enable the second battery 30 to charge/discharge. For example, in the depicted embodiment, the bi-stable relay 52A is closed during regenerative braking 170 and 174 to charge the second battery 30. Additionally, the bi-stable relay 52A is closed while the second battery 30 supplies power, for example during the portion of cruising 172 and auto-stop 176 before reaching its threshold voltage (e.g., before micro-cycling 182 and discharging 184).

As discussed above with regard to the embodiments described in FIGS. 7A-7D, the bi-stable relay 52A may be open to disconnect the second battery 30 when it is undesirable to charge or discharge the second battery 30. For example, the bi-stable relay 52A may be open when the lead-acid battery 28 is supplying power (e.g., during key-off, cold crank, acceleration, and cruising). Additionally, the bi-stable relay 52A may be open when the second battery 30 discharges to the threshold voltage (e.g., 128, 130, 156, 182, or 184). Comparatively, the lead-acid battery 28 along with the second battery 30 may supply power during key-off (e.g., 118, 146, or 168), and the alternator 18 may micro-cycle both the lead-acid battery 28 and the second battery 30 because the second battery 30 is directly coupled to the bus 26.

In some embodiments, micro-cycling the lead-acid battery 28 by itself (e.g., without micro-cycling the second battery 30) may increase the vehicle's fuel economy and/or reduce undesirable emissions because the alternator 18 charges a single battery (e.g., the lead-acid battery 28) as compared to two batteries (e.g., the lead-acid battery 28 and the second battery 30). Additionally, not micro-cycling the second battery 30 may improve the lifespan of the second battery 30 because the second battery 30 is not repeatedly charged and discharged during micro-cycling. Accordingly, the overall cost of a semi-passive architecture 50A may be reduced based on these factors.

Similarly, including the bi-stable relay 52B to selectively couple the lead-acid battery 28, as depicted in FIG. 4B, may improve the lifespan of the lead-acid battery 28 and improve the recharge efficiency of the second battery 30. For example, when the lead-acid battery 28 is maintained at less than full state of charge (e.g., the second partial voltage match embodiment) the bi-stable relay 52B may disconnect the lead-acid battery 28 during regenerative braking to steer all of the regenerative power to the second battery 30, which more efficiently captures the regenerative power. Additionally, the bi-stable relay 52B may disconnect the lead-acid battery 28 to enable the second battery 30 to be charged at a higher voltage (e.g., 16.8 volts), which may be higher than the maximum charging voltage of to the lead-acid battery 28 (e.g., overvoltage), to improve the charging rate of the second battery 30. For example, in the present embodiment, the alternator 18 may output a voltage up to 16.8 volts to charge the second battery 30. However, the maximum charging voltage of lead-acid battery 28 may be 14.8 volts because above that point the lead-acid battery 28 may begin to produce oxygen and hydrogen gas, which negatively affects the lifespan of the lead-acid battery 28. In other words, the bi-stable relay 52B may be opened to enable the second battery 30 to be more optimally charged while protecting the lead-acid battery 28 from overvoltage, for example when the batteries 28 and 30 are non-voltage matched or partial voltage matched.

Figure 8:
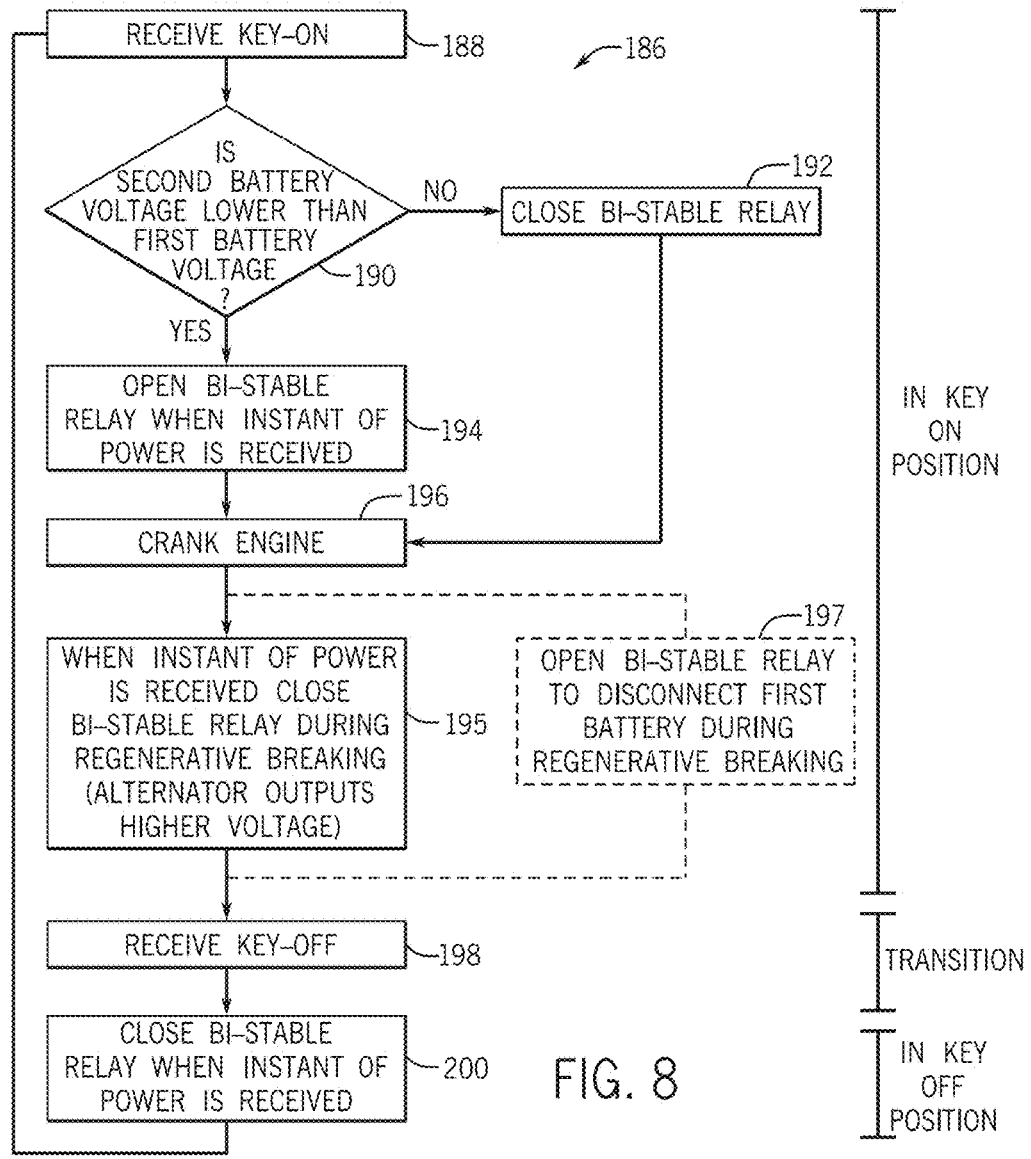
FIG. 8 is a flow diagram describing an embodiment of a method for controlling a battery system, in accordance with an embodiment of the present approach.

Based on the various embodiments of semi-passive architectures 50A, 50B described above, the control algorithm utilized by the battery control unit 36 may be more complex than the algorithm utilized for passive battery systems 42. More specifically, in addition to controlling the alternator 18, the battery control unit 36 may close and open the bi-stable relay 52 to control the operation of the semi-passive architecture 50. As described above, the bi-stable relay 52 may be closed when the battery 28 or 30 is charging or discharging and open otherwise. Further, FIG. 8 illustrates a method 186 to determine desirable times for opening and closing the bi-stable relay 52A during key-on and key-off times. Initially, at block 188, the vehicle 10 may receive a key-on signal indicating that the car is starting from an off position. When determining the position of the bi-stable relay 52A, the battery control unit 36 may make a determination, at block 190, of whether the voltage of the second battery 30 is lower than the voltage of the first battery 28. In making this determination, the battery control unit 36 determines whether the state of charge of the second battery 30 is high enough to provide support to the first battery 28 while starting the internal combustion engine 24.

For example, if the second battery 30 has a voltage greater than or equal to the first battery 28, the battery control unit 36 may instruct the bi-stable relay 52A to close at block 192. With the bi-stable relay 52A closed, the second battery 30 couples to the bus 26. Upon coupling to the bus 26, the second battery 30 may be used to assist the first battery 28 with starting the internal combustion engine 24.

Alternatively, if the second battery 30 has a voltage less than the first battery 28, the battery control unit 36 may instruct the bi-stable relay 52A to open at block 194. When the voltage of the second battery 30 is lower than the voltage of the first battery 28, it may indicate that the state of charge of the second battery 30 is very low. While the state of charge of the second battery 30 is very low, the first battery 28 may be relied on exclusively to start the vehicle 10 so as to avoid depleting the state of charge of the second battery 30 even further. In this manner, the second battery 30 may be recharged to a more functional state of charge with greater efficiency once the first battery 28 starts the vehicle 10.

After determining the voltage comparison at block 190 and closing or opening the bi-stable relay 52A at blocks 192 and 194, the first battery 28 or the batteries 28 and 30 may crank the internal combustion engine 24 at block 196. By cranking the internal combustion engine 24, the vehicle 10 may begin recharging the batteries or micro-cycling the batteries, as discussed above. Further, the battery control unit 36 may continue to open or close the bi-stable relay 52A, depending on the situation, as discussed above in the discussion for FIGS. 7A-7D. For example, the battery control unit 36 may instruct the bi-stable relay 52A to close when the vehicle 10 is undergoing regenerative braking to recharge the second battery 30 at block 195. In some embodiments, an alternator is configured to output a first voltage during regenerative braking to charge the second battery and to output a second voltage otherwise, wherein the first voltage is higher than the second voltage. In certain embodiments, the battery control unit 36 may instruct the bi-stable relay 52A to open to disconnect the first battery 28 during regenerative breaking at block 197. In some embodiments, the battery control unit 36 may instruct the bi-stable relay 52A to open when the second battery 30 drops below a threshold voltage indicating a low state of charge.

Subsequently, at block 198, the vehicle 10 may receive a key-off indication indicating that a user has stopped the internal combustion engine 24 of the vehicle 10. Upon receiving the key-off indication, the battery control unit 36 may instruct the bi-stable relay 52A to close. Once the bi-stable relay 52A is closed, components of the electrical system 46 that remain operational when the vehicle 10 is off (e.g., lights, fans, engine control modules, accessories, door locks, etc.) may be powered by the second battery 30. The second battery 30 may continue to power the components after the key-off indication until the second battery 30 reaches a predetermined threshold voltage, a predetermined amount of time has passed since receiving the key-off indication (e.g., 2-5 minutes), or the opening of a door of the vehicle 10 indicating an exit of passengers from the vehicle 10. Further, the method 186 may restart at block 188 upon completing block 200.

In another embodiment, the battery control unit 36 may open the bi-stable relay 52B to enable the second battery 30 to be optimally charged (e.g., with a higher charging voltage) while protecting the lead-acid battery 28 from overvoltage. Accordingly, the battery control unit 36 may turn on/off the alternator 18 as well as open/close the bi-stable relay 52B to maintain each of the batteries 28 and 30 at their respective target states of charge. In addition to opening/closing the bi-stable relay 52B to facilitate maintaining the batteries 28 and 30 at their target states of charge, the battery control unit 36 may disconnect the battery 28 or 30 for other reasons, such as extreme temperatures that may cause one of the batteries 28 or 30 to be outside of its optimum operating zones.

Figure 9:
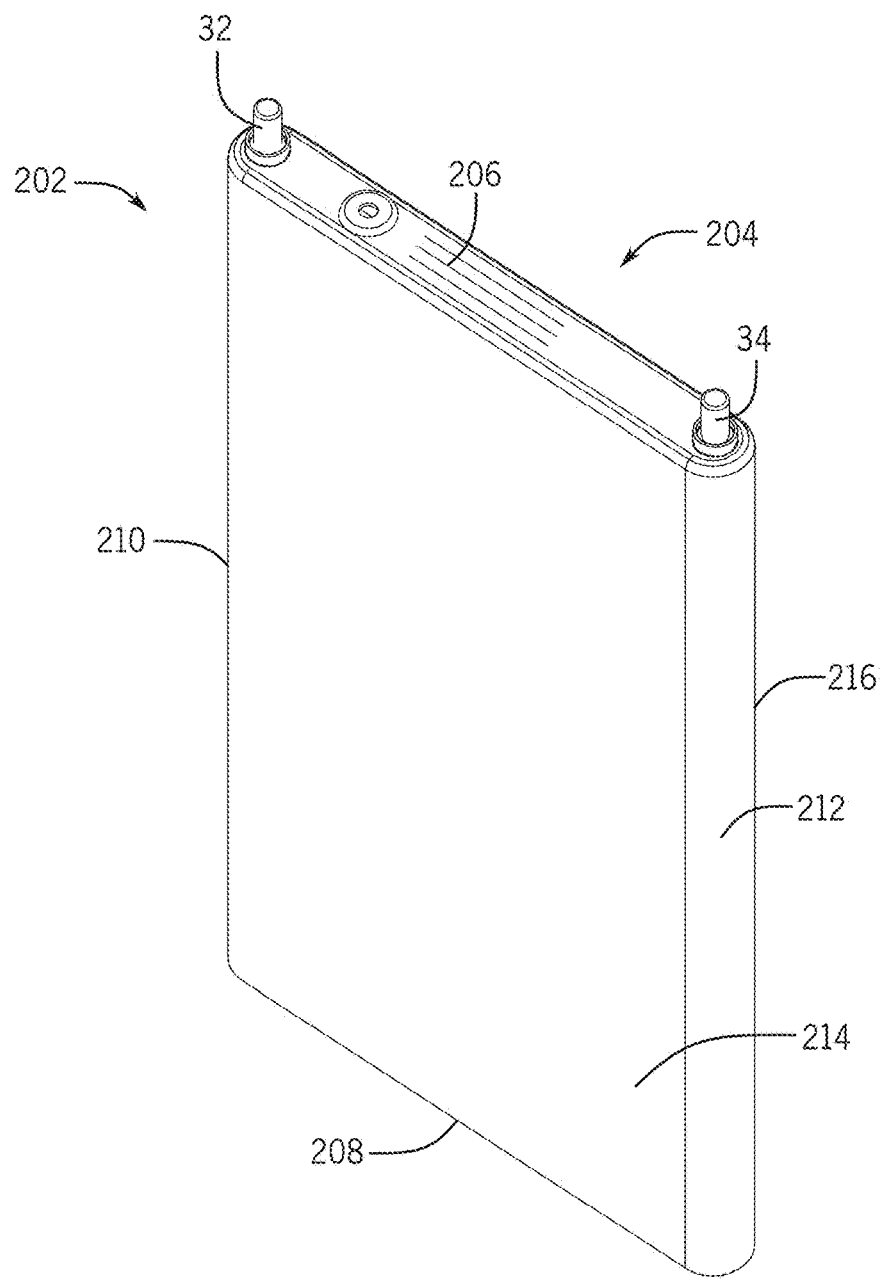
FIG. 9 is a perspective view of a prismatic battery cell used in a lithium ion battery, in accordance with an embodiment of the present approach.

One embodiment of the battery cells described herein is illustrated in FIG. 9. The battery cells described herein may be prismatic battery cells 202, where a prismatic battery cell 202, as defined herein, includes a prismatic case that is generally rectangular in shape. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion 204, where a set of cell terminals 32, 34 (e.g., positive and negative cell terminals) are located. One or more cell vents 206 may also be located on the top casing portion 204. The prismatic cell casing also includes a bottom casing portion 208 positioned opposite the top casing portion 204. First and second sides 210, 212, which may be straight or rounded, extend between the bottom and top casing portions 208, 204 in respective positions corresponding to the cell terminals 32, 34. First and second faces 214, 216, which may be flat (as shown) or rounded, couple the first and second sides 210, 212 at opposing ends of each cell 202.

One or more of the disclosed embodiments, alone or on combination, may provide one or more technical effects including coupling and decoupling the first battery 28 or the second battery 30 from the electrical system 46 based on operational situations of the vehicle 10. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system in a vehicle, comprising:
   a first battery configured to be coupled to an electrical system, wherein the first battery comprises a first battery chemistry;
   a second battery comprising a second battery chemistry that has a higher coulombic efficiency than the first battery chemistry;
   a bi-stable relay configured to be electrically coupled between the second battery and the electrical system, wherein the bi-stable relay is configured to switch from a closed position to an open position or from an open position to a closed position when an instant of power is received, and wherein the bi-stable relay is configured to:
      electrically connect the second battery to the electrical system during regenerative braking when the vehicle is in a key-on position to enable the second battery to capture a majority of power generated during the regenerative braking;
      electrically connect the second battery to a starter of the vehicle in parallel with the first battery when the vehicle transitions from a key-off position to the key-on position and a voltage of the first battery is less than a voltage of the second battery to enable the first battery and the second battery to supply power to the starter together;
      electrically disconnect the second battery from the starter when the vehicle transitions from the key-off position to the key-on position and the first voltage of the first battery is greater than the voltage of the second battery to enable the first battery to supply power to the starter by itself;
      electrically connect the second battery to the electrical system in parallel with the first battery when the vehicle is in the key-off position and the voltage of the second battery is greater than a threshold voltage to enable the first battery and the second battery to supply power to the electrical system together; and
      electrically disconnect the second battery from the electrical system when the vehicle is in the key-off position and the voltage of the second battery is not greater than the threshold voltage to enable the first battery to supply power to the electrical system by itself;

an alternator configured to output a first voltage during regenerative braking to charge the second battery and to output a second voltage otherwise, wherein the first voltage is higher than the second voltage.

2. The battery system of claim 1, comprising a battery control unit configured to maintain the first battery generally at a full state of charge before regenerative braking to enable the first battery to steer power generated during regenerative braking to the second battery using an internal resistance of the first battery.

3. The battery system of claim 1, comprising a battery control unit configured to maintain the first battery at a less than a full state of charge before regenerative braking to increase storage capacity of the second battery.

4. The battery system of claim 1, comprising a housing to house the first battery, the second battery, and the bi-stable relay, wherein the housing comprises a positive terminal and a ground terminal coupled to the first battery and selectively coupled to the second battery via the bi-stable relay, wherein the positive terminal and the ground terminal are configured to electrically connect to the electrical system.

5. The battery system of claim 1, wherein the first battery and the second battery are partial voltage matched such that a voltage range of the first battery and a voltage range of the second battery partially overlap, wherein:
   the voltage range of the first battery comprises open circuit voltages of the first battery from 0-100% state of charge;
   the voltage range of the second battery comprises open circuit voltages of the second battery from 0-100% state of charge; and
   a portion of the voltage range of the second battery that overlaps with the voltage range of the first battery corresponds to open circuit voltage of the second battery from 1-74% state of charge.

6. The battery system of claim 1, wherein the bi-stable relay is configured to:
   electrically connect the first battery to the electrical system when the bi-stable relay is in a first stable relay position; and
   electrically disconnect the first battery from the electrical system when the bi-stable relay is in a second stable relay position.

7. The battery system of claim 1, comprising a bus configured to electrically-couple the first battery and the second battery in parallel with the electrical system when the bi-stable relay is in the closed position.

8. The battery system of claim 1, wherein the electrical system comprises a battery control unit configured to output signals that instruct the bi-stable relay to selectively couple the electrical system and the second battery.

9. The battery system of claim 1, wherein the first battery chemistry is lead-acid and the second battery chemistry is lithium ion.

10. The battery system of claim 9, wherein the second battery chemistry is lithium-titanate at the anode and a lithium nickel manganese cobalt oxide (NMC) and lithium cobalt oxide (LCO) blend at the cathode.

11. An automotive battery system, comprising:
   a first battery configured to be coupled to an electrical system, wherein the first battery comprises a first battery chemistry;

a second battery coupled in parallel with the first battery, wherein the second battery comprises a second battery chemistry that has a higher coulombic efficiency than the first battery chemistry;
   a bi-stable relay configured to selectively couple the second battery to the electrical system, wherein the bi-stable relay is configured to switch from a closed position to an open position or from an open position to a closed position when an instant of power is received, and wherein the bi-stable relay is configured to:
   electrically connect the second battery to the electrical system during regenerative braking when a vehicle is in a key-on position to enable the second battery to capture a majority of power generated during regenerative braking,
   electrically connect the second battery to a starter of the vehicle when a vehicle transitions from a key-off position to the key-on position and a first voltage of the first battery is less than a second voltage of the second battery to enable the first battery and the second battery to supply power to the starter together;
   electrically disconnect the second battery from the electrical system when the vehicle transitions from the key-off position to the key-on position and the first voltage is greater than the second voltage to enable the first battery to supply power to the starter by itself;
   electrically connect the second battery in parallel with the first battery to the electrical system when the vehicle is in the key-off position and the second voltage is greater than a threshold voltage to enable the first battery and the second battery to supply power to the electrical system together; and
   electrically disconnect the second battery from the electrical system when the vehicle is in the key-off position and the second voltage is not greater than the threshold voltage to enable the first battery to supply power to the electrical system by itself.

12. The automotive battery system of claim 11, wherein the bi-stable relay is configured to maintain the second battery decoupled from the electrical system until energy is produced via regenerative braking to charge the second battery.

13. The automotive battery system of claim 11, wherein the first battery and the second battery are partial voltage matched such that a voltage range of the first battery and a voltage range of the second battery partially overlap, wherein:
   the voltage range of the first battery comprises open circuit voltages of the first battery from 0-100% state of charge;
   the voltage range of the second battery comprises open circuit voltages of the second battery from 0-100% state of charge; and
   a portion of the voltage range of the second battery that overlaps with the voltage range of the first battery corresponds to open circuit voltage of the second battery from 1-74% state of charge.

14. The automotive battery system of claim 11, comprising a starter, wherein the starter is configured to be electrically coupled in parallel with the first battery and the second battery when the bi-stable relay is in the closed position.

15. A 12 volt automotive battery system, comprising:
   a first battery configured to be selectively coupled to an electrical system, wherein the first battery comprises a first battery chemistry; and a second battery comprising a second battery chemistry that has a higher coulombic efficiency than the first battery chemistry;
an alternator configured to output a first voltage during regenerative braking and to output a second voltage otherwise, wherein the first voltage is higher than the second voltage and higher than a maximum charging voltage of the first battery; and
one or more bi-stable relays configured to be electrically connected to the electrical system, wherein the bi-stable relay is configured to:
selectively couple the first battery to the electrical system;
use power to switch from a closed position to an open position to electrically disconnect the first battery during regenerative braking to enable the second battery to be charged at the first voltage higher than the maximum charging voltage of the first battery; electrically connect the second battery to the electrical system in parallel with the first battery when the vehicle is in the key-off position and voltage of the second battery is greater than a threshold voltage to enable the first battery and the second battery to supply power to the electrical system together; and electrically disconnect the second battery from the electrical system when the vehicle is in the key-off position and the voltage of the second battery is not greater than the threshold voltage to enable the first battery to supply power to the electrical system by itself.

16. The battery system of claim 15, comprising a housing to house the first battery, the second battery, and the one or more bi-stable relays, wherein the housing comprises a positive terminal and a ground terminal electrically connected to the second battery and selectively coupled to the first battery and the second battery via the one or more b-stable relays, wherein the positive terminal and the ground terminal are configured to electrically connect to the electrical system.

17. The battery system of claim 15, wherein the bi-stable relay is configured to:
electrically disconnect the first battery from the electrical system when a vehicle transitions from a key-on position to a key-off position; and
electrically connect the first battery to the electrical system when the vehicle transitions from the key-off position to the key-on position.

18. The battery system of claim 15, wherein the maximum charging voltage of the first battery is lower than a maximum charging voltage of the second battery.

19. The battery system of claim 18, wherein the first voltage higher than the maximum charging voltage of the first battery is between 14.8 to 16.8 volts when the first battery chemistry is lead-acid and the second battery chemistry is lithium ion.

20. The battery system of claim 19, wherein the second battery chemistry is lithium-titanate at the anode and a lithium nickel manganese cobalt oxide (NMC) and lithium cobalt oxide (LCO) blend at the cathode.

* * * * *